United States Patent
Ardel et al.

(10) Patent No.: US 12,299,854 B2
(45) Date of Patent: May 13, 2025

(54) RELIABILITY FOR MACHINE-LEARNING BASED IMAGE GENERATION

(71) Applicant: SparkCognition, Inc., Austin, TX (US)

(72) Inventors: Alexandru Ardel, Austin, TX (US); Elad Liebman, Austin, TX (US); Mrinal Sen, Austin, TX (US); Georgios Alexandros Dimakis, Austin, TX (US); Yash Gandhi, Austin, TX (US); Sriram Ravula, Plano, TX (US); Dimitri Voytan, Austin, TX (US)

(73) Assignee: SPARKCOGNITION, INC., Austin, TX (US)

( * ) Notice: Subject to any disclaimer, the term of this patent is extended or adjusted under 35 U.S.C. 154(b) by 311 days.

(21) Appl. No.: 18/046,061

(22) Filed: Oct. 12, 2022

(65) Prior Publication Data
US 2023/0109854 A1   Apr. 13, 2023

Related U.S. Application Data

(60) Provisional application No. 63/362,789, filed on Apr. 11, 2022, provisional application No. 63/362,792, (Continued)

(51) Int. Cl.
*G06T 5/50*   (2006.01)
*G06N 20/00*   (2019.01)
(Continued)

(52) U.S. Cl.
CPC .............. *G06T 5/70* (2024.01); *G06N 20/00* (2019.01); *G06T 5/00* (2013.01); *G06T 5/50* (2013.01);
(Continued)

(58) Field of Classification Search
CPC ......... G06T 5/50; G06T 5/77; G06T 2200/24; G06T 2207/20216; G06V 10/25; G06V 10/751; G06V 10/758
See application file for complete search history.

(56) References Cited

U.S. PATENT DOCUMENTS

2013/0126759 A1\*   5/2013   Betzig ..................... G02B 21/16
250/459.1

FOREIGN PATENT DOCUMENTS

CN            116663173 A   \*   8/2023

OTHER PUBLICATIONS

Yonel, B., Mason, E., & Yazici, B. (2019). Deep learning for waveform estimation and imaging in passive radar. IET Radar, Sonar & Navigation, 13(6), 915-926. (Year: 2019).\*
(Continued)

*Primary Examiner* — Edward F Urban
*Assistant Examiner* — Ashley L. Hytrek
(74) *Attorney, Agent, or Firm* — Moore IP Law

(57) ABSTRACT

A method includes using a machine-learning model to determine multiple sets of image data, each representing an estimated solution to an inverse problem associated with multiple waveform return measurements. First image data are based on a first set of waveform return measurements and first model parameters of the machine-learning model, and second image data are based on a second set of waveform return measurements and a second model parameters of the machine-learning model. The method also includes determining, based on the multiple sets of image data, a representative image. The method further includes generating output data that identifies a first area of the representative image as less reliable than a second area of the representative image based on a statistical evaluation of two or more sets of image data of the multiple sets of image data.

20 Claims, 9 Drawing Sheets

Related U.S. Application Data filed on Apr. 11, 2022, provisional application No. 63/362,787, filed on Apr. 11, 2022, provisional application No. 63/263,532, filed on Nov. 4, 2021, provisional application No. 63/255,322, filed on Oct. 13, 2021.

(51) Int. Cl.

| | | |
|---|---|---|
| *G06T 5/00* | (2006.01) | |
| *G06T 5/70* | (2024.01) | |
| *G06T 5/77* | (2024.01) | |
| *G06T 11/00* | (2006.01) | |
| *G06V 10/25* | (2022.01) | |
| *G06V 10/75* | (2022.01) | |

(52) U.S. Cl.
CPC .............. *G06T 5/77* (2024.01); *G06T 11/006* (2013.01); *G06V 10/25* (2022.01); *G06V 10/751* (2022.01); *G06V 10/758* (2022.01); *G06T 2200/24* (2013.01); *G06T 2207/20081* (2013.01); *G06T 2207/20216* (2013.01)

(56) References Cited

OTHER PUBLICATIONS

Bansal, Arpit et al., "Cold Diffusion: Inverting Arbitrary Image Transforms Without Noise," Cornell University, Aug. 19, 2022, arXiv:2208.09392v1 [cs.CV], pp. 1-22.

Bashir, Y. et al., "Enhancements in Seismic Imaging using Diffraction Studies and Hybrid Traveltime Techniques for PSDM,"IOP Conf. Series: Earth and Environmental Science vol. 38, 2016, AeorEarth, doi:10.1088/1755-1315/38/1/012002, pp. 1-9.

Bora, Ashish et al., "Compressed Sensing using Generative Models," arXiv:1703.03208v1 [stat.ML] Mar. 9, 2017, https://www.cs.utexas.edu/~ecprice/papers/compressed-generative.pdf, pp. 1-24.

Chen, Chun-Fu (Richard), et al, "CrossViT: Cross-Attention Multi-Scale Vision Transformer for Image Classification," https://arxiv.org/abs/2103.14899v2, Aug. 22, 2021, pp. 1-12.

Daras, Giannis et al, "Intermediate Layer Optimization for Inverse Problems using Deep Generative Models," arXiv:2102.07364v1 [cs.LG] Feb. 15, 2021, http://proceedings.mlr.press/v139/daras21a/daras21a.pdf, pp. 1-21.

Felzenszwalb, Pedro F. et al., "Efficient Graph-Based Image Sementation," retrieved Dec. 30, 2021, http://people.cs.uchicago.edu/~pff/papers/seg-ijcv.pdf, pp. 1-26.

Harvey, James E. et al., "Modeling physical optics phenomena by complex ray tracing," Optical Engineering vol. 54, No. 3, Mar. 2015, pp. 035105-1-0351505-12.

He, Kaiming et al., "Deep Residual Learning for Image Recognition," arXiv:1512.03385v1 [cs.CV] Dec. 10, 2015, https://www.semanticscholar.org/reader/2c03df8b48bf3fa39054345bafabfeff15bfd11d, pp. 1-12.

Kaur, Harprett et al., "Improving the resolution of migrated images by approximating the inverse Hessian using deep learning," Geophysics vol. 85, No. 4 (Jul.-Aug. 2020), pp. WA173-WA183.

Menon, Sachit et al., "PULSE: Self-Supervised Photo Upsampling via Latent Space Exploration of Generative Models," arXiv:2003.03808v3 [cs.CV] Jul. 20, 2020, p. 1-20.

Nvidia, Tero Karras et al., "Analyzing and Improving the Image Quality of StyleGAN," arXiv:1912.04958v2 [cs. CV] Mar. 23, 2020, pp. 1-21.

Song, Yang et al., "Generative Modeling by Estimating Gradients of the Data Distribution," 33rd Conference on Neural Information Processing Systems (NeurIPS 2019), Vancouver, Canada, arXiv:1907.05600v2 [cs.LG] Oct. 29, 2019, pp. 1-23.

Song, Yang et al., "Score-Based Generative Modeling Through Stochastic Differential Equations," Published as a Conference Paper at ICLR 2021, arXiv:2011.13456v2 [cs.LG] Feb. 10, 2021, pp. 1-36.

Tanushev, Nicolay M. et al., "Gaussian beam decompostion for seismic migration," SEG Technical Program Expanded Abstracts, ResearchGate, Jan. 2011, pp. 1-6.

Ulyanov, Dimitry et al., "Deep Image Prior," arXiv:1711.10925v4 [cs.CV] May 17, 2020, https://dmitryulyanov.github.io/deep_image_prior, pp. 1-23.

Vamaraju, Janaki et al., "Accelerating Least Squares Imaging Using Deep Learning Techniques," Second Workshop on Machine Learning and the Physical Sciences (NeurIPS 2019), Vancouver, Canada.

Zeng, Chong et al., "A guide to least-squares reverse time migration for subsalt imaging: Challenges and solutions," Interpretation, Aug. 2017, pp. SN1-SN11.

\* cited by examiner

RELIABILITY FOR MACHINE-LEARNING BASED IMAGE GENERATION

CROSS-REFERENCE TO RELATED APPLICATIONS

The present application claims priority from U.S. Provisional Patent Application No. 63,255,322, entitled "ARTIFACT REDUCTION FOR SOLUTIONS TO INVERSE PROBLEMS", filed Oct. 13, 2021, and claims priority from U.S. Provisional Patent Application No. 63,263,532, entitled "ARTIFACT REDUCTION FOR SOLUTIONS TO INVERSE PROBLEMS", filed Nov. 4, 2021, and claims priority from U.S. Provisional Patent Application No. 63,362,787, entitled "DATA SELECTION FOR IMAGE GENERATION", filed Apr. 11, 2022, and claims priority from U.S. Provisional Patent Application No. 63,362,789, entitled "IMAGE ARTIFACT REDUCTION USING FILTER DATA BASED ON DEEP IMAGE PRIOR OPERATIONS", filed Apr. 11, 2022, and claims priority from U.S. Provisional Patent Application No. 63,362,792, entitled "RELIABILITY FOR MACHINE-LEARNING BASED IMAGE GENERATION", filed Apr. 11, 2022, the contents of each of which are incorporated herein by reference in their entirety.

FIELD

The present disclosure is generally related to determining reliability of portions of an image generated using one or more machine-learning models.

BACKGROUND

Conceptually, a "forward problem" attempts to make a prediction based on a model of causal factors associated with a system and initial conditions of the system. An "inverse problem" reverses the forward problem by attempting to model causal factors and initial conditions based on data (e.g., measurements or other observations of the system). Stated another way, an inverse problem starts with the effects (e.g., the measurements or other data) and attempts to determine model parameters, whereas the forward problem starts with the causes (e.g., a model of the system) and attempts to determine the effects. Inverse problems are used for many remote sensing applications, such as radar, sonar, medical imaging, computer vision, seismic imaging, etc.

Optimization techniques are commonly used to generate solutions to inverse problems. For example, with particular assumptions about a system that generated a set of return data, a reverse time migration technique can be used to generate image data representing the system. However, images generated using such techniques generally include artifacts. Such artifacts can be reduced by increasing the quantity of data used to generate the solution; however, generating more data is costly and time consuming. Furthermore, the computing resources required to perform optimization increase dramatically as the amount of data increases.

SUMMARY

The present disclosure describes systems and methods that use machine learning to generate image data and that indicate the reliability of portions of an image generated using one or more machine-learning models.

In some aspects, a system includes one or more processors configured to determine, using a machine-learning model, multiple sets of image data. Each set of image data of the multiple sets of image data represents an estimated solution to an inverse problem associated with multiple waveform return measurements. Determination of the multiple sets of image data includes determination of first image data of the multiple sets of image data based on a first set of waveform return measurements and using a first set of model parameters of the machine-learning model, and determination of second image data of the multiple sets of image data based on a second set of waveform return measurements and using a second set of model parameters of the machine-learning model. The one or more processors are also configured to determine, based on the multiple sets of image data, a representative image. The one or more processors are further configured to generate output data that identifies a first area of the representative image as less reliable than a second area of the representative image based on a statistical evaluation of two or more sets of image data of the multiple sets of image data.

In some aspects, a method includes determining, by one or more processors using a machine-learning model, multiple sets of image data. Each set of image data of the multiple sets of image data represents an estimated solution to an inverse problem associated with multiple waveform return measurements. Determining the multiple sets of image data includes determining first image data of the multiple sets of image data based on a first set of waveform return measurements and using a first set of model parameters of the machine-learning model. Determining the multiple sets of image data further includes determining second image data of the multiple sets of image data based on a second set of waveform return measurements and using a second set of model parameters of the machine-learning model. The method also includes determining, by the one or more processors based on the multiple sets of image data, a representative image. The method further includes generating, by the one or more processors, output data that identifies a first area of the representative image as less reliable than a second area of the representative image based on a statistical evaluation of two or more sets of image data of the multiple sets of image data.

In some aspects, a computer-readable storage device stores instructions that, when executed by one or more processors, cause the one or more processors to determine, using a machine-learning model, multiple sets of image data. Each set of image data of the multiple sets of image data represents an estimated solution to an inverse problem associated with a plurality of waveform return measurements. Determining the multiple sets of image data includes determination of first image data of the multiple sets of image data based on a first set of waveform return measurements and using a first set of model parameters of the machine-learning model. Determining the multiple sets of image data further includes determination of second image data of the multiple sets of image data based on a second set of waveform return measurements and using a second set of model parameters of the machine-learning model. The instructions, when executed by one or more processors, also cause the one or more processors to determine, based on the multiple sets of image data, a representative image. The instructions, when executed by one or more processors, further cause the one or more processors to generate output data that identifies a first area of the representative image as less reliable than a second area of the representative image based on a statistical evaluation of two or more sets of image data of the multiple sets of image data.

DETAILED DESCRIPTION

Figure 1:
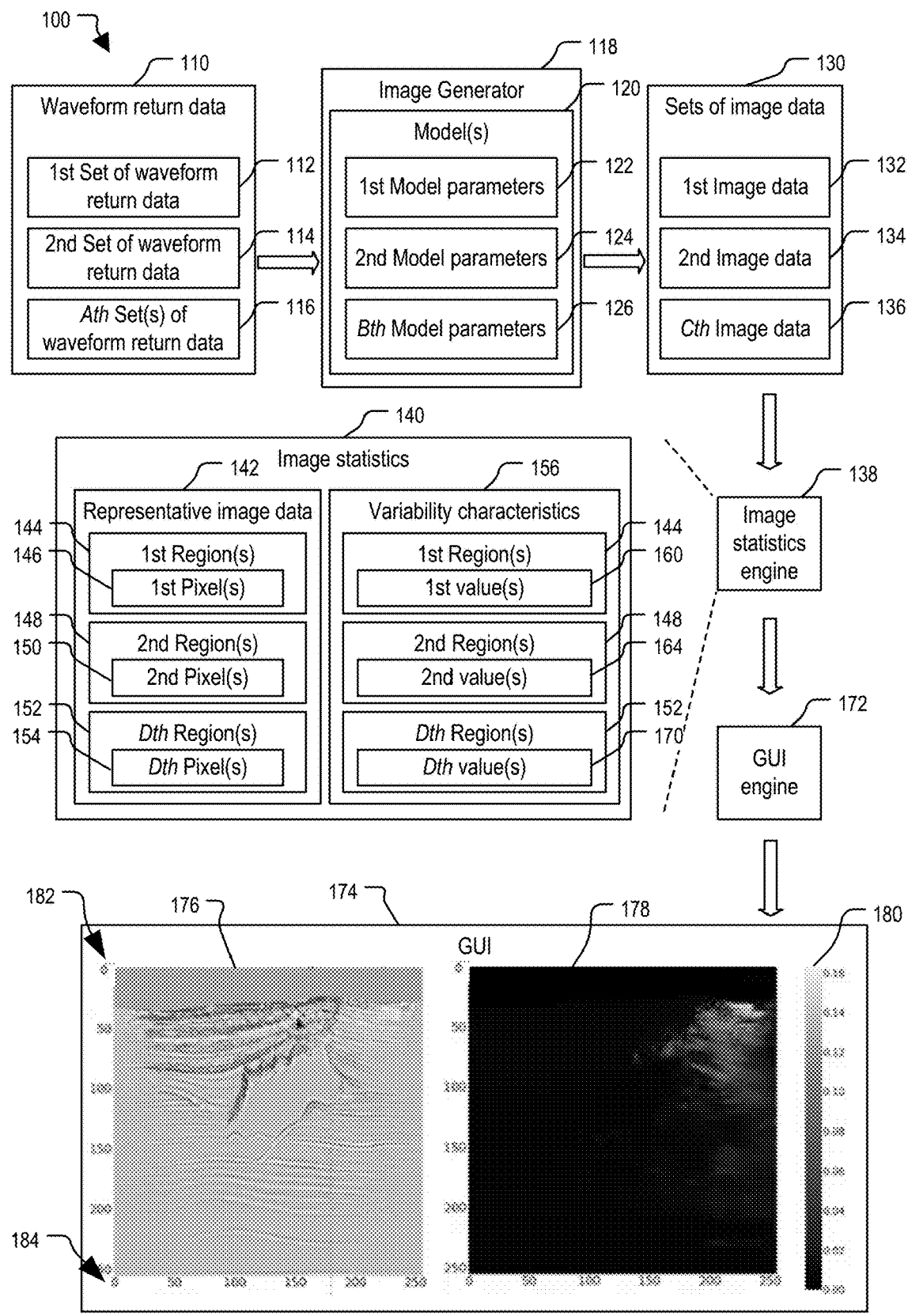
FIG. 1 is a diagram illustrating particular aspects of a system to determine reliability of portions of an image generated using one or more machine-learning models in accordance with some aspects of the present disclosure.

The present disclosure describes systems and methods that use machine-learning to generate a solution to an inverse problem. In particular, one or more machine-learning models are used to process waveform return data to generate an image representing an observed system. As one example, the observed system includes a geographic region subjected to seismic testing to model sub-surface features.

The waveform return data includes data based on records (referred to herein as "waveform return records") for multiple sampling events associated with an observed area. The image data represents a solution to an inverse problem associated with the waveform return data. For example, the waveform return data may be generated by a seismic imaging system that includes one or more sources and one or more receivers. In this example, during a particular sampling event, the source(s) cause one or more waveforms to propagate in the observed area. Subsurface features within the observed area reflect the waveform(s), and the receiver(s) generate measurements ("waveform return measurements") that indicate, for example, a magnitude of a received waveform return, a timing of receipt of the waveform return, etc. In this example, a waveform return record of the particular sampling event may include the waveform return measurements generated by the receiver(s) for the particular sampling event. Further, in this example, the waveform return data for the particular sampling event may be identical to the waveform return record, or the waveform return data may represent the waveform return record after particular data transformation operations are performed. To illustrate, the waveform return records generally include time-series data, and the waveform return data may include time-series data or may include depth domain data or images based on the time-series data.

In some implementations, machine-learning techniques may be able to generate solutions to inverse problems using less waveform return data. Using less waveform return data to generate a reliable solution saves computing resources (e.g., memory used to store data as well as working memory used to generate the solution, and processor cycles). Additionally, the time and resources used to generate large quantities of waveform return data can be reduced.

Many traditional methods for solving inverse problems use physics-based calculations. For example, waveform returns captured during seismic testing can be used to perform reverse-time migration calculations to generate an image of subsurface features. Physics-based calculations are often readily explainable from base principles, leading to high confidence in the results they generate. In contrast, it is generally difficult to explain how the calculations performed by a machine-learning model generate a reliable result. As such, professionals accustomed to relying on physics-based calculations may have less confidence in results generated by machine-learning models.

According to a particular aspect, confidence in a machine-learning based solution to an inverse problem is improved by generating reliability data accompanying the solution. As an example, one or more machine-learning models can be used to generate multiple sets of solution data (e.g., multiple sets of image data). The multiple sets of solution data can be generated using different machine-learning models, using different machine-learning model parameters, using different sets of waveform return data, using different initial conditions or assumptions, or a combination thereof. The multiple sets of solution data can be used to generate a representative solution and confidence data. As an example, the representative solution may be an average (e.g., mean, median, or mode) or other statistical representation of the multiple sets of solution data (possibly with certain sets of solution data omitted). To illustrate, the representative solution may include a representative image, such as a pixel-by-pixel average image or a region-by-region average image. The confidence data may indicate variability characteristics among the sets of solution data.

In some aspects, the representative solution can be provided to a user along with information representing the confidence data so that the user is able to accurately judge the reliability of the representative solution. For example, when the representative solution is a representative image, the representative image can be displayed along with other output data that that identifies a first area of the representative image as less reliable than a second area of the representative image. The confidence data may help the user determine whether additional data should be gathered and evaluated (e.g., to increase confidence in particular areas), whether alternative methods of generating solution data should be performed or may be omitted, etc. Further, using the techniques described herein, the quantity of waveform return data evaluated can be selected such that, even though additional resources are used to generate reliability statistics, the overall resource utilization (e.g., memory and processor time) is reduced by using machine-learning techniques rather than physics-based techniques.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further the terms "comprise," "comprises," and "comprising" may be used interchangeably with "include," "includes," or "including." Additionally, the term "wherein" may be used interchangeably with "where." As used herein, "exemplary" may indicate an example, an implementation, and/or an aspect, and should not be construed as limiting or as indicating a preference or a preferred implementation.

As used herein, an ordinal term (e.g., "first," "second," "third," "Nth," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements. Additionally, in some instances, an ordinal term herein may use a letter (e.g., "Nth") to indicate an arbitrary or open-ended number of distinct elements (e.g., zero or more elements). Different letters (e.g., "N" and "M") are used for ordinal terms that describe two or more different elements when no particular relationship among the number of each of the two or more different elements is specified. For example, unless defined otherwise in the text, N may be equal to M, N may be greater than M, or N may be less than M.

In the present disclosure, terms such as "determining," "calculating," "estimating," "shifting," "adjusting," etc. may be used to describe how one or more operations are performed. Such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, the term "machine learning" should be understood to have any of its usual and customary meanings within the fields of computers science and data science, such meanings including, for example, processes or techniques by which one or more computers can learn to perform some operation or function without being explicitly programmed to do so. As a typical example, machine learning can be used to enable one or more computers to analyze data to identify patterns in data and generate a result based on the analysis. For certain types of machine learning, the results that are generated include data that indicates an underlying structure or pattern of the data itself. Such techniques, for example, include so called "clustering" techniques, which identify clusters (e.g., groupings of data elements of the data).

For certain types of machine learning, the results that are generated include a data model (also referred to as a "machine-learning model" or simply a "model"). Typically, a model is generated using a first data set to facilitate analysis of a second data set. For example, a first portion of a large body of data may be used to generate a model that can be used to analyze the remaining portion of the large body of data. As another example, a set of historical data can be used to generate a model that can be used to analyze future data.

Since a model can be used to evaluate a set of data that is distinct from the data used to generate the model, the model can be viewed as a type of software (e.g., instructions, parameters, or both) that is automatically generated by the computer(s) during the machine learning process. As such, the model can be portable (e.g., can be generated at a first computer, and subsequently moved to a second computer for further training, for use, or both). Additionally, a model can be used in combination with one or more other models to perform a desired analysis. To illustrate, first data can be provided as input to a first model to generate first model output data, which can be provided (alone, with the first data, or with other data) as input to a second model to generate second model output data indicating a result of a desired analysis. Depending on the analysis and data involved, different combinations of models may be used to generate such results. In some examples, multiple models may provide model output that is input to a single model. In some examples, a single model provides model output to multiple models as input.

Examples of machine-learning models include, without limitation, perceptrons, neural networks, support vector machines, regression models, decision trees, Bayesian models, Boltzmann machines, adaptive neuro-fuzzy inference systems, as well as combinations, ensembles and variants of these and other types of models. Variants of neural networks include, for example and without limitation, prototypical networks, autoencoders, transformers, self-attention networks, convolutional neural networks, deep neural networks, deep belief networks, etc. Variants of decision trees include, for example and without limitation, random forests, boosted decision trees, etc.

Since machine-learning models are generated by computer(s) based on input data, machine-learning models can be discussed in terms of at least two distinct time windows—a creation/training phase and a runtime phase. During the creation/training phase, a model is created, trained, adapted, validated, or otherwise configured by the computer based on the input data (which in the creation/training phase, is generally referred to as "training data"). Note that the trained model corresponds to software that has been generated and/or refined during the creation/training phase to perform particular operations, such as classification, prediction, encoding, or other data analysis or data synthesis operations. During the runtime phase (or "inference" phase), the model is used to analyze input data to generate model output. The content of the model output depends on the type of model. For example, a model can be trained to perform classification tasks or regression tasks, as non-limiting examples. In some implementations, a model may be continuously, periodically, or occasionally updated, in which case training time and runtime may be interleaved or one version of the model can be used for inference while a copy is updated, after which the updated copy may be deployed for inference. In some implementations, a model is trained during inference, e.g., based on a particular data set, in which case training may alternatively be referred to as optimization. As used herein, optimization refers to improvement as opposed to, for example, identifying a global optimum solution.

In some implementations, a previously generated model is trained (or re-trained) using a machine-learning technique. In this context, "training" refers to adapting the model or parameters of the model to a particular data set. Unless otherwise clear from the specific context, the term "training" as used herein includes "re-training" or refining a model for a specific data set. For example, training may include so called "transfer learning." As described further below, in transfer learning a base model may be trained using a generic or typical data set, and the base model may be subsequently refined (e.g., re-trained or further trained) using a more specific data set.

A data set used during training is referred to as a "training data set" or simply "training data". The data set may be labeled or unlabeled. "Labeled data" refers to data that has been assigned a categorical label indicating a group or category with which the data is associated, and "unlabeled data" refers to data that is not labeled. Typically, "supervised machine-learning processes" use labeled data to train a machine-learning model, and "unsupervised machine-learning processes" use unlabeled data to train a machine-learning model; however, it should be understood that a label associated with data is itself merely another data element that can be used in any appropriate machine-learning process. To illustrate, many clustering operations can operate using unlabeled data; however, such a clustering operation can use labeled data by ignoring labels assigned to data or by treating the labels the same as other data elements.

Machine-learning models can be initialized from scratch (e.g., by a user, such as a data scientist) or using a guided process (e.g., using a template or previously built model). Initializing the model includes specifying parameters and hyperparameters of the model. "Hyperparameters" are characteristics of a model that are not modified during training, and "parameters" of the model are characteristics of the model that are modified during training. The term "hyperparameters" may also be used to refer to parameters of the training process itself, such as a learning rate of the training process. In some examples, the hyperparameters of the model are specified based on the task the model is being created for, such as the type of data the model is to use, the goal of the model (e.g., classification, regression, anomaly detection), etc. The hyperparameters may also be specified based on other design goals associated with the model, such as a memory footprint limit, where and when the model is to be used, etc.

Model type and model architecture of a model illustrate a distinction between model generation and model training. The model type of a model, the model architecture of the model, or both, can be specified by a user or can be automatically determined by a computing device. However, neither the model type nor the model architecture of a particular model is changed during training of the particular model. Thus, the model type and model architecture are hyperparameters of the model and specifying the model type and model architecture is an aspect of model generation (rather than an aspect of model training). In this context, a "model type" refers to the specific type or sub-type of the machine-learning model. As noted above, examples of machine-learning model types include, without limitation, perceptrons, neural networks, support vector machines, regression models, decision trees, Bayesian models, Boltzmann machines, adaptive neuro-fuzzy inference systems, as well as combinations, ensembles and variants of these and other types of models. In this context, "model architecture" (or simply "architecture") refers to the number and arrangement of model components, such as nodes or layers, of a model, and which model components provide data to or receive data from other model components. As a non-limiting example, the architecture of a neural network may be specified in terms of nodes and links. To illustrate, a neural network architecture may specify the number of nodes in an input layer of the neural network, the number of hidden layers of the neural network, the number of nodes in each hidden layer, the number of nodes of an output layer, and which nodes are connected to other nodes (e.g., to provide input or receive output). As another non-limiting example, the architecture of a neural network may be specified in terms of layers. To illustrate, the neural network architecture may specify the number and arrangement of specific types of functional layers, such as long-short-term memory (LSTM) layers, fully connected (FC) layers, convolution layers, etc. While the architecture of a neural network implicitly or explicitly describes links between nodes or layers, the architecture does not specify link weights. Rather, link weights are parameters of a model (rather than hyperparameters of the model) and are modified during training of the model.

In many implementations, a data scientist selects the model type before training begins. However, in some implementations, a user may specify one or more goals (e.g., classification or regression), and automated tools may select one or more model types that are compatible with the specified goal(s). In such implementations, more than one model type may be selected, and one or more models of each selected model type can be generated and trained. A best performing model (based on specified criteria) can be selected from among the models representing the various model types. Note that in this process, no particular model type is specified in advance by the user, yet the models are trained according to their respective model types. Thus, the model type of any particular model does not change during training.

Similarly, in some implementations, the model architecture is specified in advance (e.g., by a data scientist); whereas in other implementations, a process that both generates and trains a model is used. Generating (or generating and training) the model using one or more machine-learning techniques is referred to herein as "automated model building". In one example of automated model building, an initial set of candidate models is selected or generated, and then one or more of the candidate models are trained and evaluated. In some implementations, after one or more rounds of changing hyperparameters and/or parameters of the candidate model(s), one or more of the candidate models may be selected for deployment (e.g., for use in a runtime phase).

Certain aspects of an automated model building process may be defined in advance (e.g., based on user settings, default values, or heuristic analysis of a training data set) and other aspects of the automated model building process may be determined using a randomized process. For example, the architectures of one or more models of the initial set of models can be determined randomly within predefined limits. As another example, a termination condition may be specified by the user or based on configurations settings. The termination condition indicates when the automated model building process should stop. To illustrate, a termination condition may indicate a maximum number of iterations of the automated model building process, in which case the automated model building process stops when an iteration counter reaches a specified value. As another illustrative example, a termination condition may indicate that the automated model building process should stop when a reliability metric associated with a particular model satisfies a threshold. As yet another illustrative example, a termination condition may indicate that the automated model building process should stop if a metric that indicates improvement of one or more models over time (e.g., between iterations) satisfies a threshold. In some implementations, multiple termination conditions, such as an iteration count condition, a time limit condition, and a rate of improvement condition can be specified, and the automated model building process can stop when one or more of these conditions is satisfied.

Another example of training a previously generated model is transfer learning. "Transfer learning" refers to initializing a model for a particular data set using a model that was trained using a different data set. For example, a "general purpose" model can be trained to detect anomalies in vibration data associated with a variety of types of rotary equipment, and the general-purpose model can be used as the starting point to train a model for one or more specific types of rotary equipment, such as a first model for generators and a second model for pumps. As another example, a general-purpose natural-language processing model can be trained using a large selection of natural-language text in one or more target languages. In this example, the general-purpose natural-language processing model can be used as a starting point to train one or more models for specific natural-language processing tasks, such as translation between two languages, question answering, or classifying the subject matter of documents. Often, transfer learning can converge to a useful model more quickly than building and training the model from scratch.

Training a model based on a training data set generally involves changing parameters of the model with a goal of causing the output of the model to have particular characteristics based on data input to the model. To distinguish from model generation operations, model training may be referred to herein as optimization or optimization training. In this context, "optimization" refers to improving a metric, and does not mean finding an ideal (e.g., global maximum or global minimum) value of the metric. Examples of optimization trainers include, without limitation, backpropagation trainers, derivative free optimizers (DFOs), and extreme learning machines (ELMs). As one example of training a model, during supervised training of a neural network, an input data sample is associated with a label. When the input data sample is provided to the model, the model generates output data, which is compared to the label associated with the input data sample to generate an error value. Parameters of the model are modified in an attempt to reduce (e.g., optimize) the error value. As another example of training a model, during unsupervised training of an autoencoder, a data sample is provided as input to the autoencoder, and the autoencoder reduces the dimensionality of the data sample (which is a lossy operation) and attempts to reconstruct the data sample as output data. In this example, the output data is compared to the input data sample to generate a reconstruction loss, and parameters of the autoencoder are modified in an attempt to reduce (e.g., optimize) the reconstruction loss.

As another example, to use supervised training to train a model to perform a classification task, each data element of a training data set may be labeled to indicate a category or categories to which the data element belongs. In this example, during the creation/training phase, data elements are input to the model being trained, and the model generates output indicating categories to which the model assigns the data elements. The category labels associated with the data elements are compared to the categories assigned by the model. The computer modifies the model until the model accurately and reliably (e.g., within some specified criteria) assigns the correct labels to the data elements. In this example, the model can subsequently be used (in a runtime phase) to receive unknown (e.g., unlabeled) data elements, and assign labels to the unknown data elements. In an unsupervised training scenario, the labels may be omitted. During the creation/training phase, model parameters may be tuned by the training algorithm in use such that during the runtime phase, the model is configured to determine which of multiple unlabeled "clusters" an input data sample is most likely to belong to.

As another example, to train a model to perform a regression task, during the creation/training phase, one or more data elements of the training data are input to the model being trained, and the model generates output indicating a predicted value of one or more other data elements of the training data. The predicted values of the training data are compared to corresponding actual values of the training data, and the computer modifies the model until the model accurately and reliably (e.g., within some specified criteria) predicts values of the training data. In this example, the model can subsequently be used (in a runtime phase) to receive data elements and predict values that have not been received. To illustrate, the model can analyze time series data, in which case, the model can predict one or more future values of the time series based on one or more prior values of the time series.

In some aspects, the output of a model can be subjected to further analysis operations to generate a desired result. To illustrate, in response to particular input data, a classification model (e.g., a model trained to perform classification tasks) may generate output including an array of classification scores, such as one score per classification category that the model is trained to assign. Each score is indicative of a likelihood (based on the model's analysis) that the particular input data should be assigned to the respective category. In this illustrative example, the output of the model may be subjected to a softmax operation to convert the output to a probability distribution indicating, for each category label, a probability that the input data should be assigned the corresponding label. In some implementations, the probability distribution may be further processed to generate a one-hot encoded array. In other examples, other operations that retain one or more category labels and a likelihood value associated with each of the one or more category labels can be used.

FIG. 1 is a diagram illustrating particular aspects of a system 100 to determine reliability of portions of an image generated using one or more models 120 (e.g., machine-learning models, physics-based models, or both) in accordance with some aspects of the present disclosure. As used herein, "reliability" and "confidence level" both refer to expected accuracy statistics for particular data. "Confidence" or "confidence level" are used herein to refer to a quantitative statistic, such as a confidence interval or a margin of error, while "reliability" can refer to a qualitative or quantitative statistic. Thus, for example, a result that has "low reliability" may be associated with a larger margin of error than a result with "high reliability," and a result that has "high reliability" may be associated with a smaller margin of error than a result with "low reliability."

The system 100 includes an image generator 118 configured to use the model(s) 120 to generate sets of image data 130 based on waveform return data 110. The system 100 also includes an image statistics engine 138 and a graphical user interface (GUI) engine 172. The image statistics engine 138 is configured to generate image statistics 140 based on the sets of image data 130. The image statistics 140 include representative image data 142 and variability characteristics 156. The GUI engine 172 is configured to generate a GUI 174 that depicts a representative image 176 based on the representative image data 142. The GUI 174 also visually distinguishes among various regions of the representative image data 142 in a manner that indicates, based on the variability characteristics 156, which areas of the representative image 176 are more reliable or less reliable than other areas.

In the example of FIG. 1, the waveform return data 110 are illustrated as included within or grouped into multiple sets of waveform return data, such as a first set of waveform return data 112, a second set of waveform return data 114, and an Ath set of waveform return data 116 (where A is an integer greater than or equal to three). Each set of waveform return data 112, 114, 116 includes a subset of the waveform return data 110. In some implementations, the sets of waveform return data 112, 114, 116 are mutually exclusive (e.g., no particular waveform return is represented by data in two sets of waveform return data). In other implementations, the sets of waveform return data 112, 114, 116 are distinct (e.g., no two sets are identical), but are not necessarily mutually exclusive (e.g., a particular waveform return may be represented by data in two or more of the sets of waveform return data). Although three sets of waveform return data 112, 114, 116 are illustrated in FIG. 1, in other implementations, the waveform return data 110 are grouped into more or fewer sets.

In particular implementations, the waveform return data 110 are gathered prior to processing by the system 100. For example, the waveform return data 110 may be gathered by a seismic testing system and may represent seismic testing data samples from a particular area (referred to herein as an "observed area") subjected to seismic testing. In such implementations, the waveform return data represent, for example, the magnitude and timing of detection of waveform returns at one or more receivers. In other examples, the waveform return data 110 represent data gathered by other types of sensing systems, such as other active sensing systems, such as sonar, radar, or lidar systems that emit waveforms (e.g., sound or electromagnetic waves) and detect returns from such waveforms. The waveform return data 110 may also include other data, such as geometry data indicating positions of one or more source devices and one or more receiver devices when particular waveform return data was generated. For example, the waveform return data 110 may represent a seismic sampling event (also referred to as a "shot"), where each sampling event corresponds to a particular arrangement of source and receiver devices relative to the observed area. In this example, the waveform return data 110 represent multiple observational geometries, where each observational geometry corresponds to one or more source locations and one or more receiver locations relative to the observed area. In this example, the sets of image data 130 correspond to or represent reflectivity images, with each reflectivity image based on at least a subset of the waveform return data 110.

In some implementations, the model(s) 120 include one or more machine-learning-based, generative models that are configured to generate image data based on the waveform return data 110. As one non-limiting example, the model(s) 120 include a score matching network that is trained to perform a gradient descent artifact reduction process, as described further with reference to FIGS. 4-9C. In other examples, the model(s) 120 include one or more other generative machine-learning based models, such as a generative adversarial network (GAN), a deep belief network, or another machine-learning model.

In the same or different implementations, the model(s) 120 include one or more physics-based models. For example, the model(s) 120 may include instructions to perform reverse-time migration (RTM) operations or a variant thereof, such as least mean square reverse time migration (LSRTM) operations, instructions to perform ray tracing operations, etc.

In some implementations, the image generator 118 is configured to perform other operations in addition to operations associated with the model(s) 120. For example, the image generator 118 may include a preprocessor (e.g., a preprocessor 458 of FIG. 4) that is configured to prepare input data for the model(s) 120 based on the waveform return data 110. To illustrate, in this example, the preprocessors 458 may normalize, filter, or augment the waveform return data 110, or may perform other data manipulations to prepare input data for the model(s) 120.

In some implementations, the model(s) 120 include both machine-learning models and physics-based models that are configured to cooperate to generate image data. For example, the physics-based model(s) may include reverse-time migration instructions that are configured to perform reverse-time migration based on the waveform return data 110. To illustrate, the image generator 118 may use the reverse-time migration instructions (or another physics-based model) to generate an initial image data estimate that is provided to the machine-learning model(s) to be refined to generate image data. In another illustrative example, the image generator 118 may use the reverse-time migration instructions (or another physics-based model) to refine output of the machine-learning model(s) to generate image data. In still another illustrative example, the image generator 118 may use an iterative process to generate image data, where each iteration includes operations performed by the reverse-time migration instructions (or another physics-based model) and operations performed by the machine-learning model(s).

In the example illustrated in FIG. 1, the model(s) 120 include various sets of model parameters, such as first model parameters 122, second model parameters 124, and Bth model parameters 126 (where B is an integer greater than or equal to three). The model parameters 122, 124, 126 include or correspond to link weights, convolution kernel parameters, initialization settings, etc. In some implementations, the model(s) 120 include more than one machine-learning model (e.g., two or more generative networks). In such implementations, the first model parameters 122 may be associated with a first machine-learning model, the second model parameters 124 may be associated with a second machine-learning model, and so forth.

In some implementations, the image generator 118 uses different model parameters 122, 124, 126 to generate different image data. For example, first image data 132 may be generated using the first model parameters 122, second image data 134 may be generated using the second model parameters 124, and Cth image data 136 may be generated using Bth model parameters (where C is an integer greater than or equal to three). In some such implementations, the image generator 118 may select particular model parameters based on heuristics (e.g., to generate sets of image data 130 that meet particular criteria). In some such implementations, the image generator 118 uses each of the model parameters 122, 124, 126 for each set of waveform return data 112, 114, 116. For example, the image generator 118 may generate the first image data 132 using the first set of waveform return data 112 and the first model parameters 122, may generate the second image data 134 using the second set of waveform return data 114 and the first model parameters 122, and may generate the Cth image data 134 using the Ath set of waveform return data 116 and the first model parameters 122. Continuing this example, the image generator 118 may generate additional image data using the second model parameters 124 and each of the first, second, and Ath sets of waveform return data 112, 114, 116. In some implementations, the image generator 118 includes a single set of model parameters (e.g., the first model parameters 122), which are used to generate the sets of image data 130.

The sets of image data 130 include multiple distinct sets of image data (e.g., the first image data 132, the second image data 134, and the Cth image data 136 are different from each other) due to the use of different sets of waveform return data 112, 114, 116 to generate each set of image data, due to the use of different model parameters 122, 124, 126 to generate each set of image data, or both. The image statistics engine 138 is configured to generate the image statistics 140 based on the multiple distinct sets of image data 130. The image statistics 140 include at least representative image data 142 and variability characteristics 156.

The representative image data 142 describes an average image or another image representative of a central tendency of the sets of image data 130. In some implementations, the representative image data 142 is determined region-by-region, where each region represents one or more pixels of the representative image data 142. For example, the representative image data 142 of FIG. 1 includes data describing a first region 144 that includes one or more first pixels 146, data describing a second region 148 that includes one or more second pixels 150, and data describing a Dth region 152 that includes one or more Dth pixels 154 (where D is an integer greater than or equal to three).

Each pixel refers to an addressable point in an image that represents a portion of the observed area. In some implementations, the sets of image data 130 represent different views of the observed area. As a result, a pixel of the first image data 132 may be shifted relative to a corresponding pixel of the second image data 134. That is, the corresponding pixels may have different X-Y positions within their respective images. In such implementations, the image statistics engine 138 or the image generator 118 may shift the sets of image data 130 to a common reference frame before the image statistics 140 are generated. In some such implementations, shifting the sets of image data 130 to a common reference frame includes zero padding, averaging adjacent pixels, interpolation, or other operations to facilitate aligning of the edges of the image data.

In some implementations, the representative image data 142 is determined pixel-by-pixel. For example, a particular pixel of the first pixel(s) 146 may represent an average (e.g., mean, median, or mode) of pixel values of corresponding pixels of the sets of image data 130. In some implementations, the representative image data 142 is determined using a spatial filter (also referred to as a convolution filter). For example, a particular pixel of the first pixel(s) 146 may represent a weighted or unweighted average of pixel values of corresponding pixels of the sets of image data 130 and neighboring pixels of the corresponding pixels. In some implementations, the representative image data 142 is determined region-by-region. For example, the first region 144 may include four adjacent pixels of the representative image data 142, and the four adjacent pixels may have pixel values based on corresponding sets of adjacent pixels of the sets of image data 130

The variability characteristics 156 indicate variability of image data of the sets of image data 130 in various regions. In the example illustrated in FIG. 1, the variability characteristics 156 include first value(s) 160 representing variability of pixel values associated with the first region 144 of the representative image data 142, second value(s) 164 representing variability of pixel values associated with the second region 148 of the representative image data 142, and Dth value(s) 170 representing variability of pixel values associated with the Dth region 152 of the representative image data 142. The values 160, 164, 170 indicate, for example, a standard deviation of pixel values, a variance of pixel values, a range of pixel values, or values of another variability metric. In some implementations, the values 160, 164, 170 represent relative variability among the regions 144, 148, 152. For example, the first value 160 may indicate that pixels of the first region(s) 144 have greater variability than pixels of the second region(s) 148.

The regions 144, 148, 152 can be of any size greater than or equal to one pixel. For example, each pixel of the representative image data may be a region 144, 148, 152. In this example, regions and pixels are synonymous. In another example, each region 144, 148, 152 represents a specified number of pixels, such as a set of nine adjacent pixels of a 3×3 filter grid.

In yet another example, each of the regions 144, 148, 152 represents a specific corresponding portion of the observed area. To illustrate, the first region(s) 144 may represent a first range of depths within the observed area, and the second region(s) 148 may represent a second range of depths within the observed area. In another example, each of the regions 144, 148, 152 represents a subset of the pixels of an image (irrespective of portions of the observed area represented by the subset of pixels). To illustrate, the first region(s) 144 may represent a first band of pixels along a left side of the image, the second region(s) 148 may represent a second band of pixels alongside the first band of pixels, and the Dth region(s) 152 may represent a Dth band of pixels along a right side of the image.

The GUI engine 172 is configured to generate a GUI 174 based on the image statistics 140. In a particular aspect, the GUI 174 includes a representative image 176 that is based on (e.g., is a rendering of) the representative image data 142. The GUI 174 also includes one or more graphical elements (e.g., graphical element 178) that visually distinguishes particular areas of the representative image 176 based on the variability characteristics 156. In FIG. 1, the graphical element 178 is illustrated as a heat map that uses different colors or different greyscale shades (e.g., between white and black) to indicate different variability values. For example, a highest value of the values 160, 164, 170 may be assigned a first color, and a lowest value of the values 160, 164, 170 may be assigned a second color. In this example, values between the highest and lowest value may be assigned color gradations between the first and second color. In FIG. 1, a key 180 accompanies the graphical element 178 to show which colors stand for which variability values.

In the example illustrated in FIG. 1, the graphical element 178 and the representative image 176 are mapped to a common coordinate system represented by X-axis values 184 and Y-axis values 182. The Y-axis values 182 represent a depth scale (e.g., feet below ground level at the observed area), and the X-axis values 184 represent a width scale (e.g., feet from some specified origin point in the observed area). Thus, a user can readily determine which areas of the graphical element 178 map to corresponding areas of the representative image 176. To illustrate, in the example shown in FIG. 1, an area beginning at about 25 feet along the Y-axis and about 200 feet along the X-axis and extending to the right (in the orientation illustrated) and downward to about 100 feet in depth is less reliable (e.g., is associated with higher variability values) than much of the rest of the representative image 176.

Although FIG. 1 illustrates the graphical element 178 and the representative image 176 separately, in some implementations, the graphical element 178 is combined with the representative image 176. For example, the graphical element 178 may be rendered as an overlay on the representative image 176, or the representative image 176 may be rendered as an overlay on the graphical element 178.

Although FIG. 1 illustrates the graphical element 178 as a heat map, in other implementations, the graphical element 178 can represented the variability data in a different manner. As one example, clustering and/or binning operations can be used to identify boundaries between areas of the representative image 176 that are associated with different ranges of variability values. In this example, the boundaries can be rendered (e.g., as a topographical map) over the representative image 176 to indicate relative reliability of portions of the representative image 176.

The machine-learning techniques used by the system 100 are capable of generating similar quality images to those generated by traditional techniques, such as reverse-time migration of data representing a large number of waveform returns (e.g., a large number of shots, in a seismic imaging context). However, the machine-learning techniques are much more efficient, in terms of computer resources (e.g., processor time, power, and memory) required and in terms of the quantity of waveform return data needed. For example, the system 100 can generate high quality images of subsurface features based on a fraction of the waveform return data that would be used to generate similar quality images using reverse-time migration techniques. Further, since the images can be generated so much more efficiently, resources can be preserved even when a sufficient number of images are generated to enable the use of statistical analysis to determine how reliably particular areas of the observed area have been imaged. For example, the system 100 can generate tens or hundreds of sets of image data 130 using different sets of waveform return data 112, 114, 116, different model parameters 122, 124, 126, or both, and used the resulting sets of image data 130 to generate a representative image (e.g., an average image) and to statistically estimate the reliability of various portions of the representative image, all while using fewer computing resources and less waveform return data than would typically be used to generate the representative image using traditional reverse-time migration techniques.

Figure 2A:
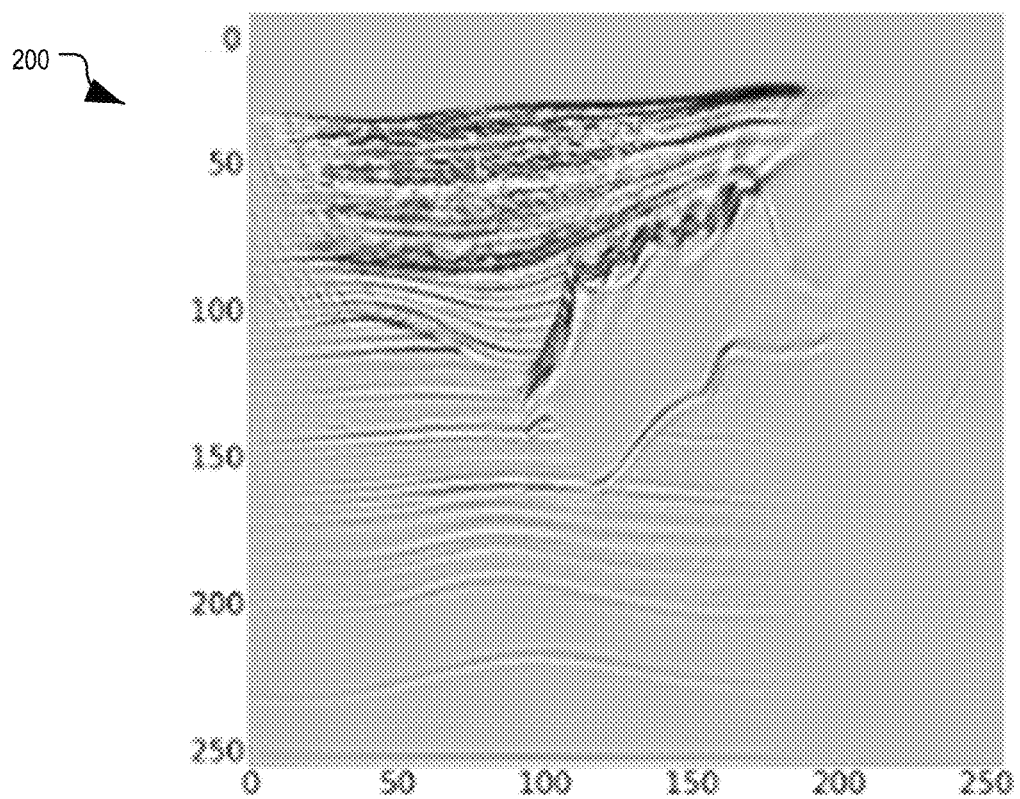
FIG. 2A is a diagram illustrating an example of a high-quality image generated using a traditional method.

FIG. 2A is a diagram illustrating an example of a high-quality image 200 generated using a traditional method. In the specific example illustrated in FIG. 2A, the high-quality image was generated using reverse time migration based on waveform return data representing 243 seismic imaging shots.

Figure 2B:
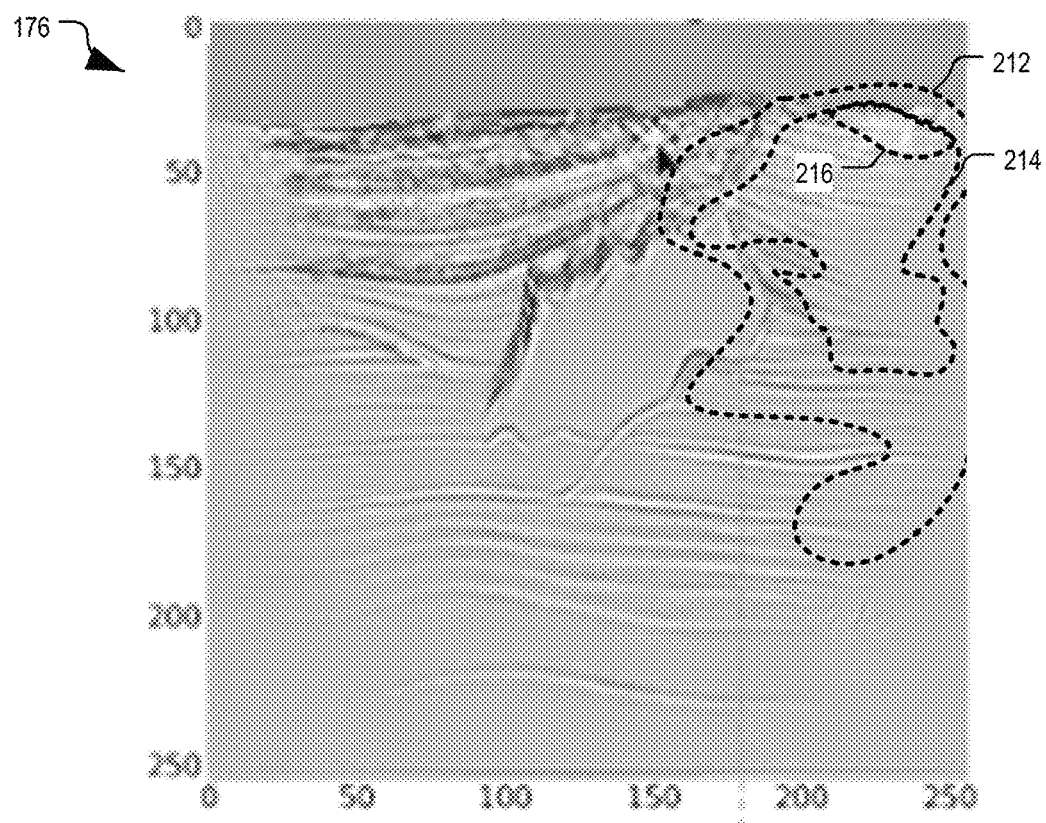
FIG. 2B is a diagram illustrating an example of output by the system of FIG. 1 that includes a representative image and reliability indications generated in accordance with some aspects of the present disclosure.

FIG. 2B is a diagram illustrating one example of an output generated by system 100 of FIG. 1. In FIG. 2B, the representative image 176 of FIG. 1 is overlain with boundary lines 212, 214, 216 that indicate regions of differing variability characteristics among the sets of image data 130 used to generate the representative image 176. The representative image 176 of FIG. 2B is the same as the representative image 176 of FIG. 1 to facilitate comparison of the representation of the variability characteristics 156 as a heat map in FIG. 1 and the representation of the variability characteristics 156 as one or more boundaries in FIG. 2B. In FIG. 2B, a first boundary line 212 encompasses a set of pixels of the representative image 176 having variability values greater than a first threshold (e.g., approximately a standard deviation of 0.04 in this example), a second boundary line 214 encompasses a set of pixels of the representative image 176 having variability values greater than a second threshold (e.g., approximately a standard deviation of 0.09 in this example), and a third boundary line 216 encompasses a set of pixels of the representative image 176 having variability values greater than a third threshold (e.g., approximately a standard deviation of 0.14 in this example).

A comparison of FIG. 2A and FIG. 2B shows that in the areas associated with high variability (e.g., within the first boundary line 212), the representative image 176 of FIG. 2B includes features representing layers that look normal as compared to other layer features of the representative image 176. However, such layer features are missing from the right side of the high-quality image 200 because the waveform return data (e.g., shot data) used to generate both images 200 and 176 do not includes sufficient coverage of the portion of the observed area that corresponds to the right side of the high-quality image 200. Thus, the features representing layers within the first boundary line 212 are products of the models 120 predicting the presence of layers.

The representative image 176 accurately captures many of the features represented in the high-quality image 200. However, the representative image 176 was generated using waveform return data representing only 8 seismic shots (in contrast to the 243 seismic shots used to generate the high-quality image). Addition of reliability information to the representative image 176, such as the boundary lines 212, 214, 216, assists the user with recognizing which areas of the representative image 176 should not be relied upon. Thus, the system 100 is able to generate useful image data (e.g., the output represented in FIG. 2B or the GUI 174 of FIG. 1) using considerably fewer resources than would be used to generate a high-quality image using traditional techniques.

Figure 3:
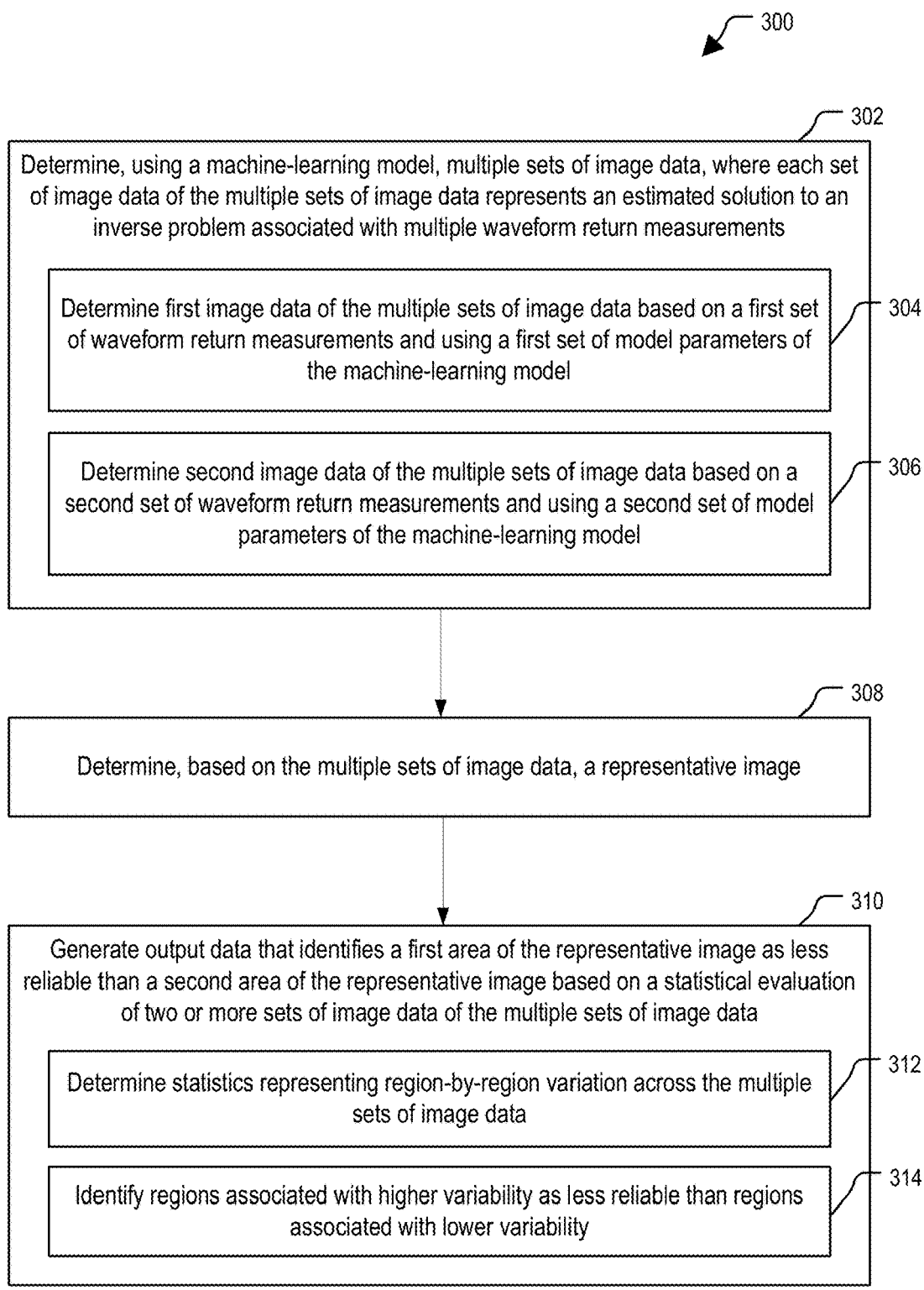
FIG. 3 illustrates a flow chart of an example of a method of determining reliability of portions of an image generated using one or more machine-learning models in accordance with some aspects of the present disclosure.

FIG. 3 illustrates a flow chart of an example of a method 300 of determining reliability of portions of an image generated using one or more machine-learning models in accordance with some aspects of the present disclosure. One or more operations described with reference to FIG. 3 may be performed by the system 100, such as by one or more computing devices executing instructions. To illustrate, one or more of the operations described with reference to FIG. 3 may be performed by the computer system 400 of FIG. 4, such as by the processor(s) 402 executing the instructions 444.

The method 300 includes, at 302, determining, using a machine-learning model, multiple sets of image data, where each set of image data of the multiple sets of image data represents an estimated solution to an inverse problem associated with multiple waveform return measurements. For example, the image generator 118 of FIG. 1 may generate the multiple sets of image data 130 based on the waveform return data 110. As described with reference to FIG. 1, the image generator 118 uses the one or more models 120 to process the waveform return data 110 to generate the sets of image data 130.

In some implementations, determining the multiple sets of image data in the method 300 includes, at 304, determining first image data of the multiple sets of image data based on a first set of waveform return measurements and using a first set of model parameters of the machine-learning model and, at 306, determining second image data of the multiple sets of image data based on a second set of waveform return measurements and using a second set of model parameters of the machine-learning model. For example, the image generator 118 may use the first model parameters 122 to process the first set of waveform return data 112 to generate the first image data 132 and may use the second model parameters 124 to process the second set of waveform return data 114 to generate the second image data 134. In some implementations, the first set of waveform return data 112 at least partially overlap the second set of waveform return data 114; whereas, in other implementations, the first and second sets of waveform return data 112, 114 are mutually exclusive data sets. Likewise, in some implementations, the first model parameters 122 at least partially overlap the second model parameters 124; whereas, in other implementations, the first and second model parameters 122, 124 include (e.g., are) mutually exclusive sets of parameters. The model parameters include, for example, initial conditions, link weights, convolution kernel parameters, other machine-learning model parameters, or combinations thereof.

As a nonlimiting example, and as explained further below, one or more of the model(s) 120 may use an iterative gradient descent artifact reduction process. In this example, determining a particular set of image data 130 using the model(s) 120 includes determining a gradient associated with a particular estimated solution (e.g., image data) to an inverse problem and adjusting the particular estimated solution (e.g., image data) to the inverse problem based on the gradient to generate an updated estimated solution (e.g., updated image data).

The method 300 also includes, at 308, determining, based on the multiple sets of image data, a representative image. For example, the image statistics engine 138 of FIG. 1 may generate the image statistics 140, which include the representative image data 142. The representative image data 142 can be rendered (e.g., by the GUI engine 172) to depict the representative image 176.

The method 300 further includes, at 310, generating output data that identifies a first area of the representative image as less reliable than a second area of the representative image based on a statistical evaluation of two or more sets of image data of the multiple sets of image data. For example, the GUI engine 172 is configured to generate the GUI 174, which includes the representative image 176. The GUI 174 may also include information that visually distinguishes two or more areas of the representative image 176 to indicate relative reliability of the areas.

In a particular implementation, generating output data in the method 300 includes, at 312, determining statistics representing region-by-region variation across the multiple sets of image data and, at 314, identifying regions associated with higher variability as less reliable than regions associated with lower variability. For example, the image statistics engine 138 of FIG. 1 is configured to generate the image statistics 140 based on the multiple sets of image data 130. In this example, the image statistics 140 indicate variability characteristics associated with various regions (e.g., regions 144, 148, 152) of the representative image data 142. Regions with higher variability correspond to areas of the representative image 176 that are less reliable, and regions with lower variability correspond to areas of the representative image 176 that are more reliable. Each of the regions 144, 148, 152 corresponds to one or more pixels of the representative image 176.

The method 300 enables generation of similar quality images to those generated by traditional techniques (e.g., reverse-time migration) in a manner that is more efficient in terms of computer resources (e.g., processor time, power, and memory) required and in terms of the quantity of waveform return data needed. Additionally, the method 300 addresses user concerns regarding reliability and explainability of results generated using machine learning.

Figure 4:
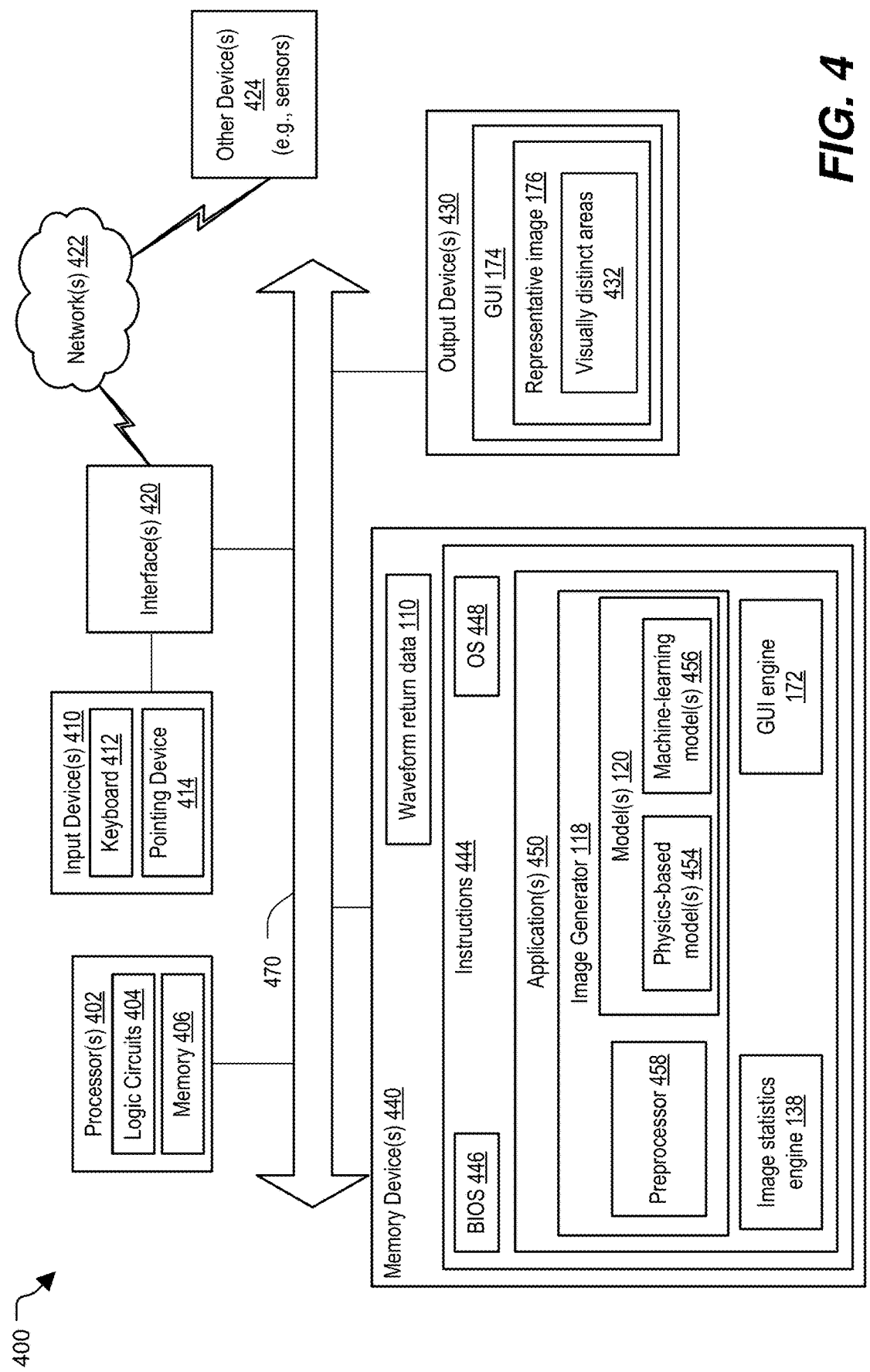
FIG. 4 illustrates an example of a computer system configured to use machine-learning to generate image data and to determine reliability of portions of the image data in accordance with some aspects of the present disclosure.

FIG. 4 illustrates an example of a computer system 400 configured to use machine-learning to generate image data and to determine reliability of portions of the image data in accordance with some aspects of the present disclosure. For example, the computer system 400 is configured to initiate, perform, or control one or more of the operations described with reference to FIG. 1 or 3. The computer system 400 can be implemented as or incorporated into one or more of various other devices, such as a personal computer (PC), a tablet PC, a server computer, a personal digital assistant (PDA), a laptop computer, a desktop computer, a communications device, a wireless telephone, or any other machine capable of executing a set of instructions (sequential or otherwise) that specify actions to be taken by that machine. Further, while a single computer system 400 is illustrated, the term "system" includes any collection of systems or sub-systems that individually or jointly execute a set, or multiple sets, of instructions to perform one or more computer functions. While FIG. 4 illustrates one example of the computer system 400, other computer systems or computing architectures and configurations may be used for carrying out the operations disclosed herein.

The computer system 400 includes one or more processors 402. Each processor of the one or more processors 402 can include a single processing core or multiple processing cores that operate sequentially, in parallel, or sequentially at times and in parallel at other times. Each processor of the one or more processors 402 includes circuitry defining a plurality of logic circuits 404, working memory 406 (e.g., registers and cache memory), communication circuits, etc., which together enable the processor(s) 402 to control the operations performed by the computer system 400 and enable the processor(s) 402 to generate a useful result based on analysis of particular data and execution of specific instructions.

The processor(s) 402 are configured to interact with other components or subsystems of the computer system 400 via a bus 470. The bus 470 is illustrative of any interconnection scheme serving to link the subsystems of the computer system 400, external subsystems or devices, or any combination thereof. The bus 470 includes a plurality of conductors to facilitate communication of electrical and/or electromagnetic signals between the components or subsystems of the computer system 400. Additionally, the bus 470 includes one or more bus controllers or other circuits (e.g., transmitters and receivers) that manage signaling via the plurality of conductors and that cause signals sent via the plurality of conductors to conform to particular communication protocols.

In FIG. 4, the computer system 400 includes one or more output devices 430, one or more input devices 410, and one or more interface devices 420. Each of the output device(s) 430, the input device(s) 410, and the interface device(s) 420 can be coupled to the bus 470 via a port or connector, such as a Universal Serial Bus port, a digital visual interface (DVI) port, a serial ATA (SATA) port, a small computer system interface (SCSI) port, a high-definition media interface (HDMI) port, or another serial or parallel port. In some implementations, one or more of the output device(s) 430, the input device(s) 410, and/or the interface device(s) 420 is coupled to or integrated within a housing with the processor(s) 402 and the memory device(s) 440, in which case the connections to the bus 470 can be internal, such as via an expansion slot or other card-to-card connector. In other implementations, the processor(s) 402 and the memory device(s) 440 are integrated within a housing that includes one or more external ports, and one or more of the output device(s) 430, the input device(s) 410, and/or the interface device(s) 420 is coupled to the bus 470 via the external port(s).

Examples of the output device(s) 430 include display devices, speakers, printers, televisions, projectors, or other devices to provide output of data (e.g., solution data representing a solution to an inverse problem) in a manner that is perceptible by a user. Examples of the input device(s) 410 include buttons, switches, knobs, a keyboard 412, a pointing device 414, a biometric device, a microphone, a motion sensor, or another device to detect user input actions. The pointing device 414 includes, for example, one or more of a mouse, a stylus, a track ball, a pen, a touch pad, a touch screen, a tablet, another device that is useful for interacting with a graphical user interface, or any combination thereof. A particular device may be an input device 410 and an output device 430. For example, the particular device may be a touch screen.

The interface device(s) 420 are configured to enable the computer system 400 to communicate with one or more other devices 424 directly or via one or more networks 422. For example, the interface device(s) 420 may encode data in electrical and/or electromagnetic signals that are transmitted to the other device(s) 424 as control signals or packet-based communication using pre-defined communication protocols. As another example, the interface device(s) 420 may receive and decode electrical and/or electromagnetic signals that are transmitted by the other device(s) 424. To illustrate, the other device(s) 424 may include sensor(s) that generate the waveform return data 110. The electrical and/or electromagnetic signals can be transmitted wirelessly (e.g., via propagation through free space), via one or more wires, cables, optical fibers, or via a combination of wired and wireless transmission.

The computer system 400 also includes the one or more memory devices 440. The memory device(s) 440 include any suitable computer-readable storage device depending on, for example, whether data access needs to be bi-directional or unidirectional, speed of data access required, memory capacity required, other factors related to data access, or any combination thereof. Generally, the memory device(s) 440 includes some combinations of volatile memory devices and non-volatile memory devices, though in some implementations, only one or the other may be present. Examples of volatile memory devices and circuits include registers, caches, latches, many types of random-access memory (RAM), such as dynamic random-access memory (DRAM), etc. Examples of non-volatile memory devices and circuits include hard disks, optical disks, flash memory, and certain types of RAM, such as resistive random-access memory (ReRAM). Other examples of both volatile and non-volatile memory devices can be used as well, or in the alternative, so long as such memory devices store information in a physical, tangible medium. Thus, the memory device(s) 440 include circuits and structures and are not merely signals or other transitory phenomena (i.e., are non-transitory media).

In the example illustrated in FIG. 4, the memory device(s) 440 store instructions 444 that are executable by the processor(s) 402 to perform various operations and functions. The instructions 444 include instructions to enable the various components and subsystems of the computer system 400 to operate, interact with one another, and interact with a user, such as a basic input/output system (BIOS) 446 and an operating system (OS) 448. Additionally, the instructions 444 include one or more applications 450, scripts, or other program code to enable the processor(s) 402 to perform the operations described herein. For example, in FIG. 4, the instructions 444 include instructions corresponding to the image generator 118, the image statistics engine 138, and the GUI engine 172, which are executable by the processor(s) 402 to initiate, control, or perform one or more of the operations described with reference to FIG. 1 or 3. For example, instructions corresponding to the image generator 118, the image statistics engine 138, and the GUI engine 172 can be executed to process the waveform return data 110 to generate the GUI 174, which includes the representative image 176 and visually distinguishes one or more areas (e.g., visually distinct areas 432) of the representative image 176 based on respective reliability of each of the areas.

In the example illustrated in FIG. 4, the image generator 118 includes a preprocessor 458 and the model(s) 120. In FIG. 4, the model(s) 120 include physics-based model(s) 454, and machine-learning model(s) 456, or both.

In a particular implementation, as described further below, the physics-based model(s) 454 and the machine-learning model(s) 456 are configured to interact (e.g., to exchange solution data) to generate a solution to an inverse problem. In a particular implementation, the solution to the inverse problem is represented as image data (e.g., a reflectivity image), which can be rendered by the GUI engine 172 to generate a graphical user interface (GUI) 174 for display via one of the output device(s) 430.

As one example, the image generator 118, when executed by the processor(s) 402 causes the processor(s) 402 to initiate, perform, or control an iterative process in which the physics-based model(s) 454 generate, based on the waveform return data 110, first solution data that is descriptive of a first estimated solution to the inverse problem. In this example, the first solution data is provided as input to the machine-learning model(s) 456, and one or more parameters of a gradient descent artifact reduction process are initialized based on the first solution data. The gradient descent artifact reduction process uses a plurality of iterations to generate second solution data. As a result of operations performed by the gradient descent artifact reduction process, artifacts in the second solution data are reduced relative to artifacts in the first solution data.

In a particular implementation, an iteration of the gradient descent artifact reduction process includes determining, using one of the machine-learning model(s) 456, a gradient associated with particular solution data (e.g., the first solution data or solution data generated by a prior iteration of the gradient descent artifact reduction process). The iteration also includes adjusting the particular solution data based on the gradient to generate updated solution data.

As one example, the image generator 118 may perform operations as described by the following pseudocode. In the following pseudocode, a "shot" refers to a single sampling event, measurements from which may be used to generate a corresponding set of waveform return data. In other contexts (e.g., other than seismic imaging) shots may be replaced with other sampling events (e.g., pings in the context of sonar).

```
x₀ ← RTM(k)
for n iterations:
    for m artifact levels:
        αₘ = ε*λₘ/λₘᵢₙ
        for t=1,..T Langevin steps:
            xₜ ← xₜ₋₁ + αₘ S(xₜ₋₁, λₘ) + noise
        Optional or selective, for p shots:
            Perform physics-based modeling to generate revised xₜ
```

In the pseudocode above, RTM(k) represents an aggregation of k reverse time migration results (e.g., a combined image based on k images, each based on waveform return data for a respective shot), where k is an integer greater than one. For example. RTM(8) refers to solution data based on reverse time migration of 8 waveform return measurements of the waveform return data 110. The solution data generated by RTM(k) is used as an initial estimate ($x_0$) of a solution to the inverse problem. Additionally, in the pseudocode above, n is a configurable counter having a value greater than or equal to one. Further, in the pseudocode above, m is a counter indicating a number of artifact levels over which operations are performed, where m is an integer greater than or equal to one and less than or equal to a count of the total number of shots represented in the waveform return data 110 or that are otherwise available. In this context, an "artifact level" refers to any metric that characterizes and distinguishes the number, distribution, and/or intensity of migration swing artifacts in a set of images. Generally, m is set within a range from a smallest number of shots (referred to as $k_{min}$) that can be used to generate acceptable solution data to a largest number of shots (referred to as $k_{max}$) that the image generator 118 is allowed to use. In a particular implementation, $k_{min}$ is associated with a largest artifact level, $\lambda_{max}$ (e.g., strongest artifacts in the solution data) used to train or optimize the machine-learning model 456, and $k_{max}$ is associated with a smallest artifact level, $\lambda_{min}$ (e.g., weakest artifacts in the solution data) used to train or optimize the machine-learning model(s) 456.

Additionally, in the pseudocode above, $\alpha_m$ is a step size parameter used by the Langevin operations in the inner loop and is annealed (e.g., iteratively decreased) based on a ratio of the current artifact level, $\lambda_m$, to the smallest artifact level, $\lambda_{min}$, used to train or optimize the machine-learning model 456 adjusted by a configurable parameter ε.

Further, in the pseudocode above, an inner loop performs T iterations to modify the solution data x to decrease artifacts present in the solution data, where T is an integer greater than or equal to two. Generally, good results have been achieved with values of T on the order of 100 to 200. In each inner loop iteration, solution data $x_t$ is determined by adjusting prior solution data $x_{t-1}$ based on a gradient $\alpha_m S(x_{t-1}, \lambda_m)$, and where $S(x_{t-1}, \lambda_m)$ is an output of the machine-learning model 456 based on the prior solution data $x_{t-1}$ and the current artifact level, $\lambda_m$.

In some implementations, after T iterations of the inner loop to generate solution data $x_t$, the solution data may be adapted to satisfy particular constraints. In some implementations, the solution data is adapted to conform the solution data to specified expectations, such as physical constraints of the observed system. Such adaptation of the solution data is optional. To illustrate, such adaptation can be omitted entirely in some implementations. In some implementations, adaptation of the solution data is selectively performed. To illustrate, particular solution data may be adapted to conform to specified constraints based on characteristics of the solution data or based on output of one or more the operations performed by the pseudocode.

In some implementations, the pseudocode above also includes one or more iterations of the physics-based model(s) 454. For example, within the n iterations loop and after the T Langevin steps loop, the pseudocode may include performing one or more least mean square reverse time migration (LSRTM) iterations of p shots, where p is an integer greater than one. In some implementations, p is set equal to k. In some implementations, physics-based modelling after the T Langevin steps loop is optional. To illustrate, physics-based modelling can be omitted entirely in some implementations. In some implementations, physics-based modelling after the T Langevin steps loop is selectively performed. To illustrate, physics-based modelling may be performed based on characteristics of the solution data generated by the T Langevin steps loop or based on output of another operation performed by the pseudocode.

One benefit of using a gradient descent artifact reduction process based on the pseudocode above is that high-quality solutions (e.g., solutions with weaker or fewer artifacts) can be generated using fewer computing resources than would be used to generate similar high-quality solutions using reverse time migration alone. To illustrate, the images illustrated in FIGS. 8A-8C and 9A-9C show examples of results based on simulated seismic sensing. As explained above, in the context of seismic sensing and imaging, sampling events are generally referred to as "shots", and waveform return measurements associated with each shot correspond to waveform return data for the shot. However, in other sensing contexts, sampling events may be referred to using different terminology.

Figure 8A:
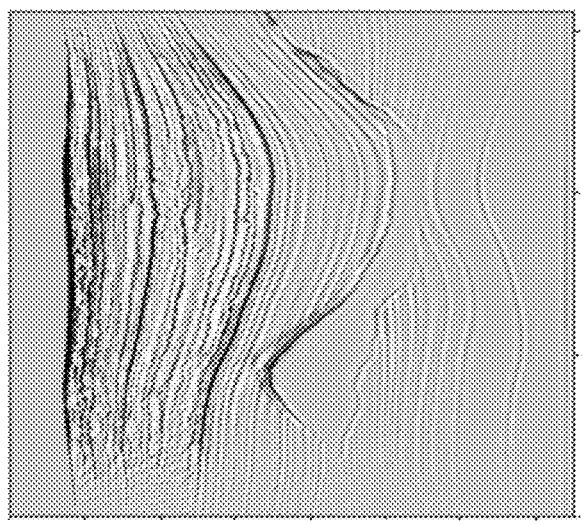
FIG. 8A is a diagram illustrating a solution generated via reverse time migration based on a large number of waveform return measurements.
Figure 8B:
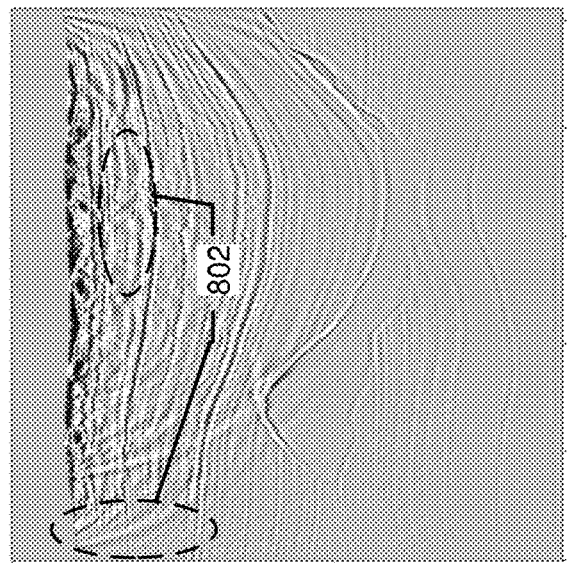
FIG. 8B is a diagram illustrating a solution generated via reverse time migration based on a much smaller number of waveform return measurements than used for FIG. 8A.
Figure 9A:
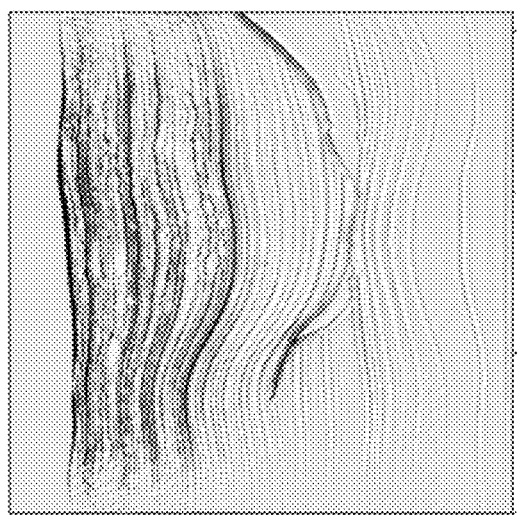
FIG. 9A is a diagram illustrating a solution generated via reverse time migration based on a large number of waveform return measurements.
Figure 9B:
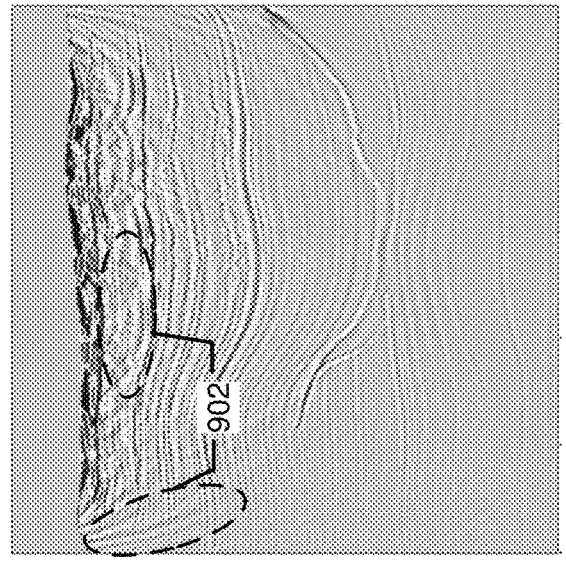
FIG. 9B is a diagram illustrating a solution generated via reverse time migration based on a much smaller number of waveform return measurements than used for FIG.

FIGS. 8A and 9A show images that were each generated using only reverse time migration based on 243 shots. FIGS. 8B and 9B show images that were each generated using only reverse time migration based on 8 shots. Note that in FIG. 8B, significant visual artifacts are present in regions 802.

Figure 8C:
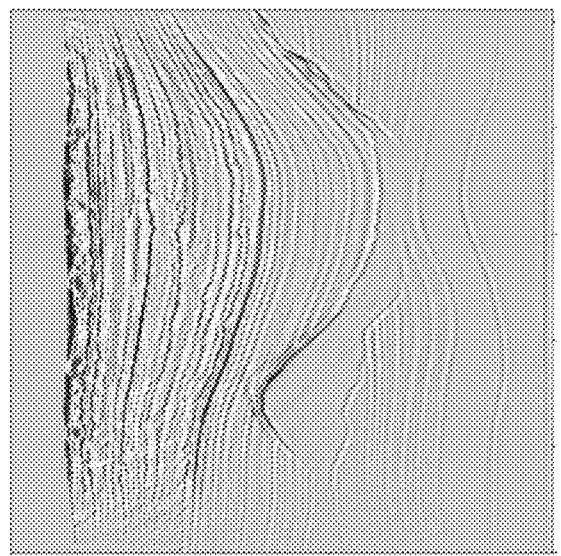
FIG. 8C is a diagram illustrating a solution generated, based on the same number of waveform return measurements as used for FIG. 8B, via reverse time migration and gradient descent artifact reduction, according to particular aspects disclosed herein.
Figure 9C:
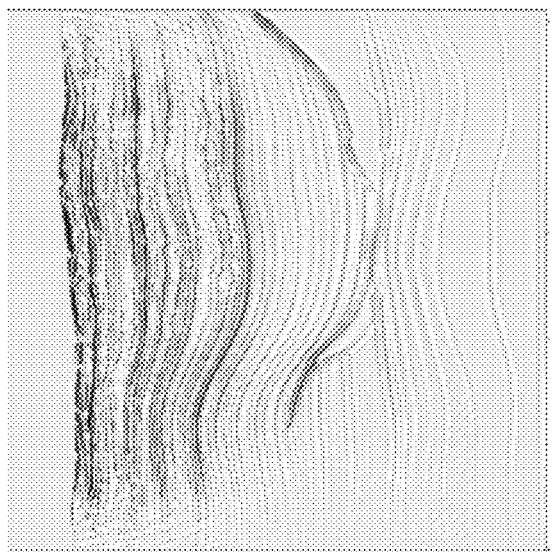
FIG. 9C is a diagram illustrating a solution generated, based on the same number of waveform return measurements as used for FIG. 9B, via reverse time migration and gradient descent artifact reduction, according to particular aspects disclosed herein.

Significant visual artifacts are also present in FIG. 9B in regions 902. FIGS. 8C and 9C show images that were each generated using reverse time migration based on 8 shots and a gradient descent artifact reduction process based on the pseudocode above. To generate FIGS. 8C and 9C, n was set to 1, m was set to 1 and T was set to 200, R was zeroed out, and no LSRTM iterations were performed after the T Langevin steps loop.

Comparison of FIG. 8B with FIG. 8C shows that the gradient descent artifact reduction process significantly reduced the number and/or visual strength of the artifacts present in FIG. 8C as compared to the artifacts present in FIG. 8B. Likewise, comparison of FIG. 9B with FIG. 9C shows that the gradient descent artifact reduction process significantly reduced the number and/or visual strength of the artifacts present in FIG. 9C as compared to the artifacts present in FIG. 9B. For many purposes, FIGS. 8C and 9C may be useful substitutes for FIGS. 8A and 9A; however, generation of FIGS. 8C and 9C used significantly fewer computing resources (e.g., power, processor cycles, memory) than generation of FIGS. 8A and 9A. Further, significant time and expense can be saved by generating only the 8 shots used for FIGS. 8C and 9C rather than the 243 shots as used for FIGS. 8A and 9A. Additionally, FIGS. 8C and 9C can be used with other images to generate image statistics 140, such as representative image data 142 (e.g., an average image) and variability characteristics 156, which facilitates user understanding of which area(s) of the representative image data 142 are more reliable and which area(s) are less reliable.

Returning to FIG. 4, in a particular implementation, the machine-learning model 456 includes or corresponds to a score-matching network. The score-matching network may be trained, for example, by obtaining multiple sets of solution data based on waveform return measurements (e.g., the waveform return data 110). In this example, each set of solution data corresponds to a physics-based solution to the inverse problem, and each set of solution data is associated with a respective artifact level. In general, the artifact level of a set of solution data can be reduced by using waveform return data from a larger number of sampling events (e.g., more shots). Multiple sets of training data are generated based on the multiple sets of solution data. For example, each set of training data is based on one or more sets of solution data associated with a respective artifact level. To illustrate, a set of training data associated with a particular artifact level is determined based on differences between a set of solution data associated with a lowest artifact level and a set of solution data with the particular artifact level.

The score matching network is trained using the multiple sets of training data. For example, the score matching network may be trained by adjusting parameters of the score matching network to decrease a value of an objective function. In this example, the value of the objective function represents a weighted sum of values of objective functions for multiple different artifact levels. To illustrate, the objective function for a particular artifact level $\lambda$ may be represented by:

$$\ell(\theta; k) = \frac{1}{2} \mathbb{E}_{p_{data}(x)} \mathbb{E}_{RTM(k)} \left[ \left\| s_\theta(\tilde{x}, \lambda) + \frac{x_{RTM(K)} - x_{RTM(k)}}{\lambda_k^2} \right\|_2^2 \right]$$

In this example, the objective function used to train or optimize the score matching network may be represented by:

$$\mathcal{L}(\theta; \{k\}_{i=1}^L) = \frac{1}{L} \sum_{i=1}^L \gamma(\lambda_{k_i}^2) \ell(\theta; \lambda_i)$$

In the objective function for a particular artifact level $\lambda$, $p_{data(x)}$ refers to a probability density function of a data set x and $\mathbb{E}_{p_{data}(x)}$ represents an expectation over $p_{data(x)}$ and $\mathbb{E}_{RTM(k)}$ represents an expectation over the set of images that are produced (e.g., an expectation over each allowed k value and over each set of specific images from the set of available image that are used to generate the k shots). $S_\theta(\tilde{x},\lambda)$ represents solution data generated by the machine-learning model 456 for a particular artifact level $\lambda$. Further, $x_{RTM(K)}$ represents solution data generated by a physics-based model (e.g., RTM) based on K shots, where K is a count of shots of the largest set of shots used for any solution in the training data, and $x_{RTM(k)}$ represents solution data generated by the physics-based model (e.g., RTM) based on k shots, where k is an integer greater than one and less than K.

$$\frac{x_{RTM(K)} - x_{RTM(k)}}{\lambda_k^2}$$

represents a value of an error metric that is based on a difference between solution data associated with the particular artifact level (corresponding to using k shots) and solution data associated with a lowest artifact level (corresponding to using K shots) of the multiple sets of solution data used to generate the training data.

In the objective function used to train or optimize the score matching network, L is the total count of artifact levels used, and $\gamma$ is a function of a fitting parameter that is based on an error metric associated with the particular artifact level. In some implementations, $\gamma$ is equal to $\lambda^2$.

In a particular implementation, values of $\lambda$ for a particular count of shots can be determined by determining multiple RTM(k) solutions for the same value of k. For example, from among a large set of waveform return data 110, multiple subsets of k shots can be selected. To illustrate, in the example of seismic sampling, different source and/or receiver positions can be selected for different subsets of k shots. The RTM(k) values for a particular value of k can be compared to RTM(K) to determine a mean square error for the artifact level associated with k. The value of $\lambda$ for the particular count of shots k can be determined by fitting a parameterized function to the mean square error values with respect to a normalized count of shots (e.g., $k_{min}/k$).

Figure 7:
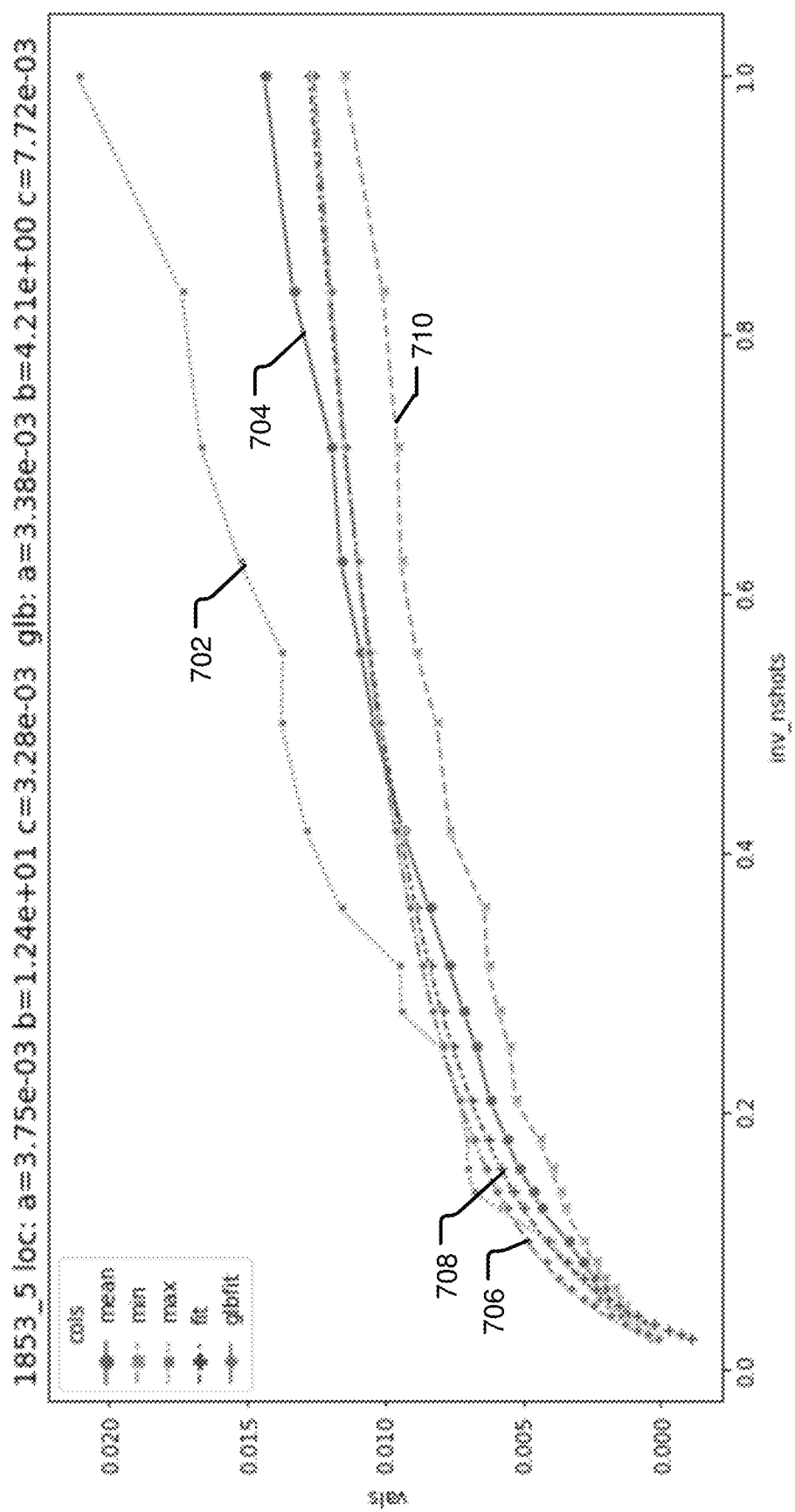
FIG. 7 is a diagram illustrating particular aspects of determining parameters of a gradient descent artifact reduction system.

FIG. 7 is a diagram illustrating particular aspects of determining parameters of a gradient descent artifact reduction system. In particular, FIG. 7 illustrates a plot of data points with $k_{min}/k$ on the x-axis and mean square error (MSE) of RTM(K)-RTM(k) on the y-axis. In FIG. 7, lines 702, 704, 708, and 710 represent data for a particular slice (e.g., a two-dimensional visualization) of an observed system. For example, a line 702 connects maximum MSE(RTM(K)-RTM(k)) values for the slice, a line 710 connects minimum MSE(RTM(K)-RTM(k)) values for the slice, a line 704 connects values of a mean of a distribution of values of the MSE(RTM(K)-RTM(k)) for the slice, and a line 708 represents a curve fit to values connected by the line 704. A line 706 represents a curve fit based on averaging across multiple slices. The line 706 represents values of $\lambda^2$.

In an alternative embodiment, dedicated hardware implementations, such as application specific integrated circuits, programmable logic arrays and other hardware devices, can be constructed to implement one or more of the operations described herein. Accordingly, the present disclosure encompasses software, firmware, and hardware implementations.

Figure 5:
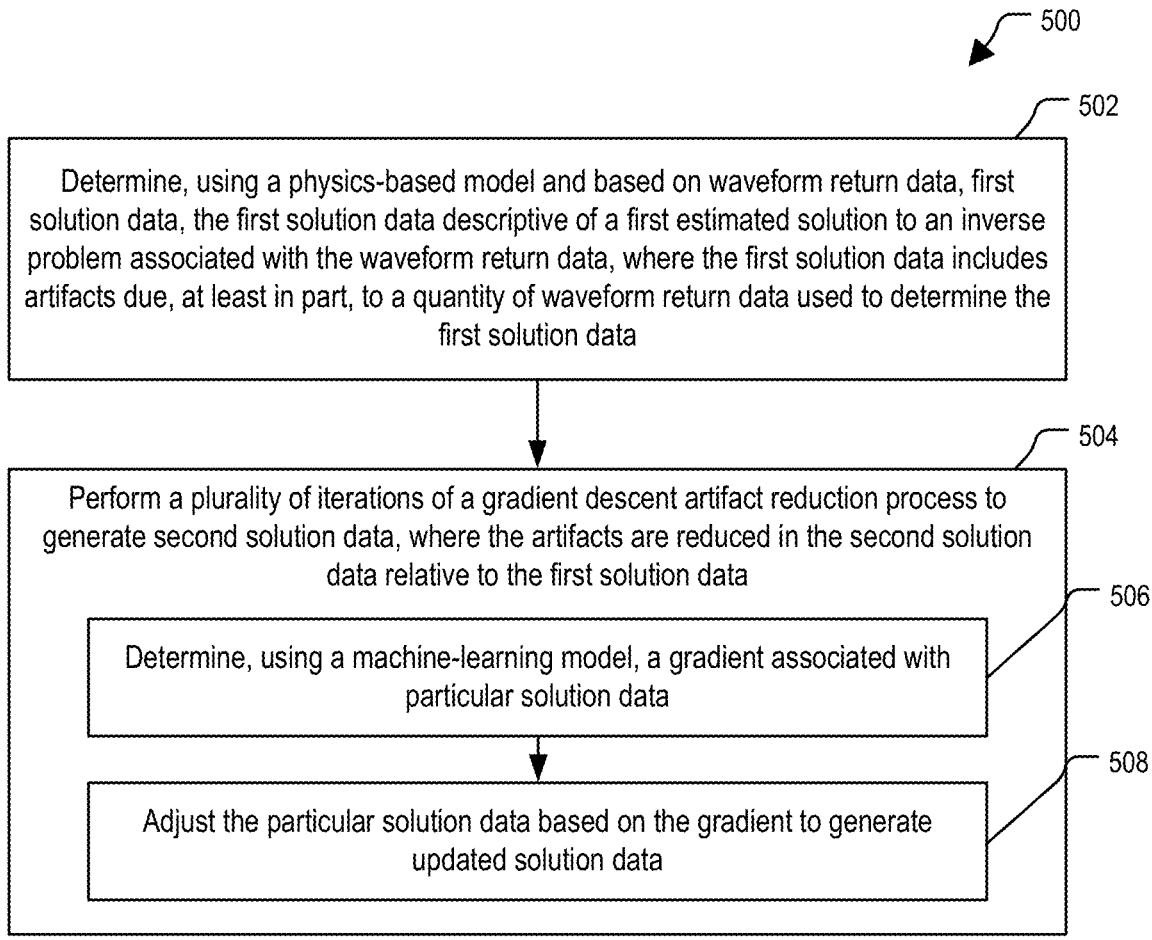
FIG. 5 is a flow chart of an example of a method of generating image data that includes reducing artifacts in solution data associated with an inverse problem.

FIG. 5 is a flow chart of an example of a method of reducing artifacts in solution data (e.g., image data) associated with an inverse problem. One or more operations described with reference to FIG. 5 may be performed by the computer system 400 of FIG. 4, such as by the processor(s) 402 executing the instructions 444.

The method 500 includes, at 502, determining, using a physics-based model and based on waveform return data, first solution data. The first solution data is descriptive of a first estimated solution to an inverse problem associated with the waveform return data. The first solution data includes artifacts due, at least in part, to the quantity of waveform return data used to determine the first solution data.

As a particular example, the waveform return data may include waveform return measurements associated with one or more seismic imaging shots. In this particular example, the first solution data may be determined by performing one or more iterations of reverse time migration based on the waveform return measurements associated with the one or more seismic imaging shots. In this example, the first estimated solution to the inverse problem may include a reflectivity image. In other examples, the waveform return data may be associated with other waveform-based measurement systems, such as sonar, lidar, or radar.

The method 500 also includes, at 504, performing a plurality of iterations of a gradient descent artifact reduction process to generate second solution data. The artifacts are reduced in the second solution data relative to the first solution data. A particular iteration of the gradient descent artifact reduction process includes, at 506, determining, using a machine-learning model (e.g., a score-matching network, such as the machine-learning model 456), a gradient associated with particular solution data, and at 508, adjusting the particular solution data based on the gradient to generate updated solution data.

In some implementations, the method 500 also includes, after determining the second solution data, providing the second solution data as input to the physics-based model to generate third solution data. For example, a result generated by the Langevin steps of the pseudocode above may be subjected to one or more LSRTM iterations to further refine the solution. In some such implementations, the method 500 may further include, performing a second plurality of iterations of the gradient descent artifact reduction process to generate fourth solution data, where the artifacts are reduced in the fourth solution data relative to the third solution data.

In some implementations, during the particular iteration of the gradient descent artifact reduction process, the particular solution data is adjusted further based on a step size parameter (e.g., $\alpha_m$). Further, the step size parameter may be adjusted after one or more iterations. For example, the gradient descent artifact reduction process may include, after performing the plurality of iterations, adjusting the step size parameter and performing a second plurality of iterations using the adjusted step size parameter. In a particular aspect, the step size parameter is based on a ratio of an error metric associated with a count of waveform measurement events (e.g., shots) and an error metric associated with a specified minimum count of waveform measurement events.

In some implementations, the particular solution data generated via one or more iterations is adjusted further based on one or more specified constraints. For example, particular solution data may be modified to enforce expected features of the solution data (e.g., an image) based on prior knowledge or assumptions about the observed system. As another example, particular solution data may be modified to enforce physics-based or experience-based expectations, such as an arrangement of features in the solution data.

One benefit of the method 500 is that it facilitates generation of high-quality solutions (e.g., solutions with weaker or fewer artifacts) using fewer computing resources than would be used to generate similar high-quality solutions using RTM alone. Further, the method 500 uses less waveform return data (e.g., fewer seismic imaging shots) than would be used to generate similar high-quality solutions using RTM alone. As a result, time and resources expended to gather the waveform return data can be reduced.

Figure 6:
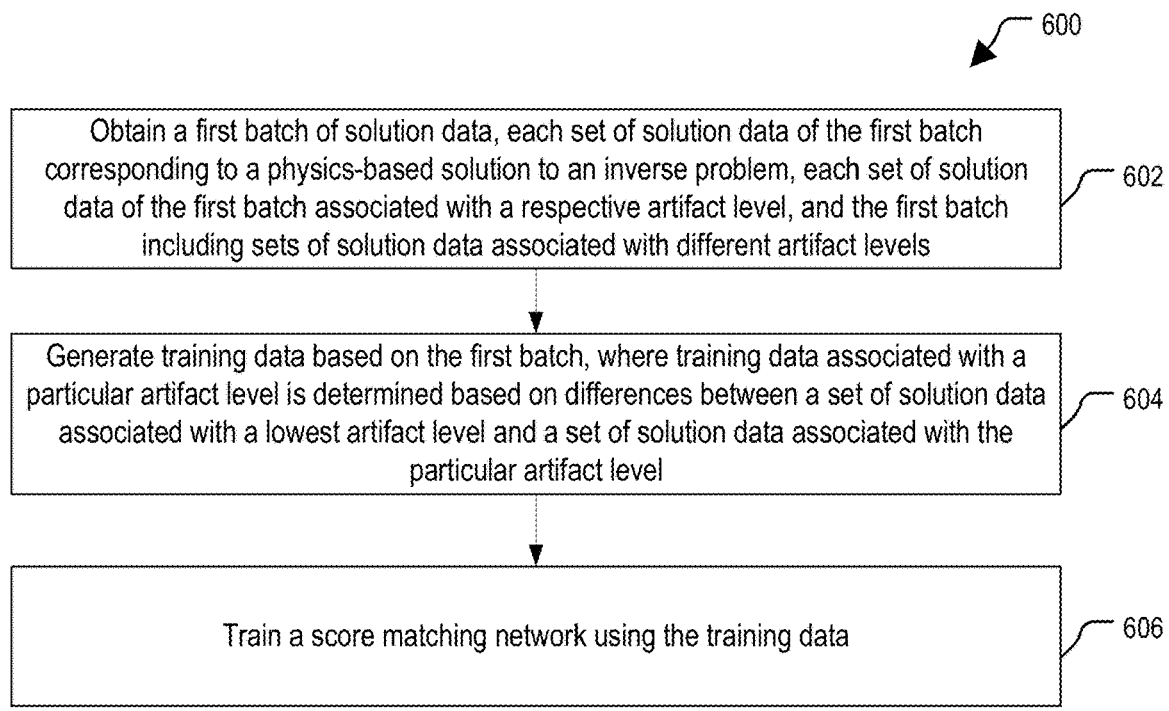
FIG. 6 is a flow chart of an example of a method of training or optimizing a machine-learning model of a gradient descent artifact reduction system.

FIG. 6 is a flow chart of an example of a method of training a machine-learning model of a gradient descent artifact reduction system. One or more operations described with reference to FIG. 6 may be performed by the computer system 400 of FIG. 4, such as by the processor(s) 402 executing the instructions 444.

The method 600 includes, at 602, obtaining a first batch of solution data. Each set of solution data of the first batch corresponds to a physics-based solution to an inverse problem and is associated with a respective artifact level. For example, the sets of solution data may be determined using reverse time migration (RTM). As one specific example, RTM is performed for each set of waveform return data (e.g., each shot in a seismic imaging context) of a plurality of sets of waveform return data that are available to be processed to generate RTM data.

In this example, a first set of solution data may include RTM data based on $k_1$ sets of waveform return data, where $k_1$ is an integer that is greater than one and indicates a quantity of waveform return data included in the set. For example, the $k_1$ sets of waveform return data may include waveform return data associated with $k_1$ sampling events (e.g., $k_1$ shots in a seismic imaging context), and the $k_1$ sets of waveform return data do not include all of the waveform return data that are available for processing. Further, in this example, a second set of solution data may include RTM data based on $k_2$ sets of waveform return data, where $k_2$ is an integer that is greater than $k_1$ and indicates a quantity of waveform return data included in the second set. The $k_2$ sets of waveform return data also do not include all of the waveform return data that are available for processing. Similarly, other sets of solution data may include RTM data for sets of waveform return data. In some implementations, a randomized process is used to select the specific sets of waveform return data (from all of the waveform return data that are available for processing) used to determine a particular set of solution data. In the same or different implementations, a randomized process is used to select a k value used to determine a quantity of waveform return data used for each set of solution data.

The method 600 includes, at 604, generating training data based on the first batch. The training data associated with a particular artifact level is determined based on differences between a set of solution data associated with a lowest artifact level and a set of solution data associated with the particular artifact level.

The method 600 includes, at 606, training a score matching network using the training data. For example, training the score matching network may include adjusting parameters of the score matching network to decrease a value of an objective function, where the value of the objective function represents a weighted sum of values of objective functions for multiple different artifact levels. In this example, a value of an objective function for a particular artifact level of the multiple different artifact levels is weighted based on a fitting parameter, and the fitting parameter is based on an error metric associated with the particular artifact level. To illustrate, a value of the error metric may be determined based on a difference between solution data associated with the particular artifact level and solution data associated with a lowest artifact level of the multiple sets of solution data.

In some implementations, the score matching network may be further trained based on one or more additional batches of training data. For example, the method 600 may include obtaining one or more second batches of solution data corresponding to physics-based solutions to the inverse problem, generating additional training data based on the one or more second batches, and training the score matching network using the additional training data.

Although FIGS. 5 and 6 describe the training and use of one particular type of machine-learning model (e.g., a score matching network), other types of machine-learning models can be used by the system 100 of FIG. 1 and the method 300 of FIG. 3. For example, a GAN can be used to generate the sets of image data 130 based on the waveform return data 110.

Particular aspects of the disclosure are highlighted in the following Examples:

According to Example 1, a method includes: determining, by one or more processors using a machine-learning model, multiple sets of image data, wherein each set of image data of the multiple sets of image data represents an estimated solution to an inverse problem associated with multiple waveform return measurements, and wherein determining the multiple sets of image data includes: determining first image data of the multiple sets of image data based on a first set of waveform return measurements and using a first set of model parameters of the machine-learning model; and determining second image data of the multiple sets of image data based on a second set of waveform return measurements and using a second set of model parameters of the machine-learning model; determining, by the one or more processors based on the multiple sets of image data, a representative image; and generating, by the one or more processors, output data that identifies a first area of the representative image as less reliable than a second area of the representative image based on a statistical evaluation of two or more sets of image data of the multiple sets of image data.

Example 2 includes the method of Example 1, wherein the multiple sets of image data include the first image data, the second image data, and one or more additional sets of image data.

Example 3 includes the method of Example 1 or the method of Example 2, wherein the representative image corresponds to an average image based on the multiple sets of image data.

Example 4 includes the method of any of Examples 1 to 3, wherein generating the output data includes: determining statistics representing region-by-region variation across the multiple sets of image data; and identifying regions associated with higher variability as less reliable than regions associated with lower variability.

Example 5 includes the method of any of Examples 1 to 4, wherein generating the output data includes: determining, based on the multiple sets of image data, pixel-by-pixel variability characteristics of the representative image; and assigning groups of pixels to the first area or the second area based on the pixel-by-pixel variability characteristics.

Example 6 includes the method of any of Examples 1 to 5, wherein the output data includes a graphical user interface depicting the representative image and visually distinguishing the first area from the second area.

Example 7 includes the method of any of Examples 1 to 6, wherein the first set of waveform return measurements is distinct from the second set of waveform return measurements.

Example 8 includes the method of any of Examples 1 to 7, wherein the first set of model parameters is distinct from the second set of model parameters.

Example 9 includes the method of any of Examples 1 to 8, wherein determining the first image data includes performing multiple iterations of a gradient descent artifact reduction process, wherein a particular iteration of the gradient descent artifact reduction process includes: determining, using the machine-learning model, a gradient associated with a particular estimated solution to the inverse problem; and adjusting the particular estimated solution to the inverse problem based on the gradient to generate an updated estimated solution.

Example 10 includes the method of Example 9, wherein the multiple iterations of the gradient descent artifact reduction process are initialized based on solution data determined via reverse time migration based on at least a subset of the multiple waveform return measurements.

Example 11 includes the method of any of Examples 1 to 10, wherein each image of the multiple sets of image data corresponds to a reflectivity image based on at least a subset of the waveform return measurements.

Example 12 includes the method of any of Examples 1 to 11, wherein the machine-learning model corresponds to a score-matching network.

According to Example 13, a system includes: one or more processors configured to: determine, using a machine-learning model, multiple sets of image data, wherein each set of image data of the multiple sets of image data represents an estimated solution to an inverse problem associated with multiple waveform return measurements, and wherein determination of the multiple sets of image data includes: determination of first image data of the multiple sets of image data based on a first set of multiple waveform return measurements and using a first set of model parameters of the machine-learning model; and determination of second image data of the multiple sets of image data based on a second set of multiple waveform return measurements and using a second set of model parameters of the machine-learning model; determine, based on the multiple sets of image data, a representative image; and generate output data that identifies a first area of the representative image as less reliable than a second area of the representative image based on a statistical evaluation of two or more sets of image data of the multiple sets of image data.

Example 14 includes the system of Example 13, wherein the multiple sets of image data include the first image data, the second image data, and one or more additional sets of image data.

Example 15 includes the system of Example 13 or the system of Example 14, wherein the representative image corresponds to an average image based on the multiple sets of image data.

Example 16 includes the system of any of Examples 13 to 15, wherein to generate the output data the one or more processors are configured to: determine statistics representing region-by-region variation across the multiple sets of image data; and identify regions associated with higher variability as less reliable than regions associated with lower variability.

Example 17 includes the system of any of Examples 13 to 16, wherein to generate the output data the one or more processors are configured to: determine, based on the multiple sets of image data, pixel-by-pixel variability characteristics of the representative image; and assign groups of pixels to the first area or the second area based on the pixel-by-pixel variability characteristics.

Example 18 includes the system of any of Examples 13 to 17, wherein the output data includes a graphical user interface depicting the representative image and visually distinguishing the first area from the second area.

Example 19 includes the system of any of Examples 13 to 18 wherein the first set of waveform return measurements is distinct from the second set of waveform return measurements.

Example 20 includes the system of any of Examples 13 to 19, wherein the first set of model parameters is distinct from the second set of model parameters.

Example 21 includes the system of any of Examples 13 to 20, wherein to determine the first image data the one or more processors are configured to perform multiple iterations of a gradient descent artifact reduction process, wherein a particular iteration of the gradient descent artifact reduction process includes: determining, using the machine-learning model, a gradient associated with a particular estimated solution to the inverse problem; and adjusting the particular estimated solution to the inverse problem based on the gradient to generate an updated estimated solution.

Example 22 includes the system of Example 21, wherein the multiple iterations of the gradient descent artifact reduction process are initialized based on solution data determined via reverse time migration based on at least a subset of the multiple waveform return measurements.

Example 23 includes the system of any of Examples 13 to 22, wherein each image of the multiple sets of image data corresponds to a reflectivity image based on at least a subset of the waveform return measurements.

Example 24 includes the system of any of Examples 13 to 23, wherein the machine-learning model corresponds to a score-matching network.

According to Example 25, a computer-readable storage device stores instructions that, when executed by one or more processors, cause the one or more processors to: determine, using a machine-learning model, multiple sets of image data, wherein each set of image data of the multiple sets of image data represents an estimated solution to an inverse problem associated with multiple waveform return measurements, and wherein determining the multiple sets of image data includes: determination of first image data of the multiple sets of image data based on a first set of waveform return measurements and using a first set of model parameters of the machine-learning model; and determination of second image data of the multiple sets of image data based on a second set of waveform return measurements and using a second set of model parameters of the machine-learning model; determine, based on the multiple sets of image data, a representative image; and generate output data that identifies a first area of the representative image as less reliable than a second area of the representative image based on a statistical evaluation of two or more sets of image data of the multiple sets of image data.

Example 26 includes the computer-readable storage device of Example 25, wherein the multiple sets of image data include the first image data, the second image data, and one or more additional sets of image data.

Example 27 includes the computer-readable storage device of Example 25 or the computer-readable storage device of Example 26, wherein the representative image corresponds to an average image based on the multiple sets of image data.

Example 28 includes the computer-readable storage device of any of Examples 25 to 27, wherein generating the output data includes: determining statistics representing region-by-region variation across the multiple sets of image data; and identifying regions associated with higher variability as less reliable than regions associated with lower variability.

Example 29 includes the computer-readable storage device of any of Examples 25 to 28, wherein generating the output data includes: determining, based on the multiple sets of image data, pixel-by-pixel variability characteristics of the representative image; and assigning groups of pixels to the first area or the second area based on the pixel-by-pixel variability characteristics.

Example 30 includes the computer-readable storage device of any of Examples 25 to 29, wherein the output data includes a graphical user interface depicting the representative image and visually distinguishing the first area from the second area.

Example 31 includes the computer-readable storage device of any of Examples 25 to 30, wherein the first set of waveform return measurements is distinct from the second set of waveform return measurements.

Example 32 includes the computer-readable storage device of any of Examples 25 to 31, wherein the first set of model parameters is distinct from the second set of model parameters.

Example 33 includes the computer-readable storage device of any of Examples 25 to 32, wherein determining the first image data includes performing multiple iterations of a gradient descent artifact reduction process, wherein a particular iteration of the gradient descent artifact reduction process includes: determining, using the machine-learning model, a gradient associated with a particular estimated solution to the inverse problem; and adjusting the particular estimated solution to the inverse problem based on the gradient to generate an updated estimated solution.

Example 34 includes the computer-readable storage device of Example 33, wherein the multiple iterations of the gradient descent artifact reduction process are initialized based on solution data determined via reverse time migration based on at least a subset of the multiple waveform return measurements.

Example 35 includes the computer-readable storage device of any of Examples 25 to 34, wherein each image of the multiple sets of image data corresponds to a reflectivity image based on at least a subset of the waveform return measurements.

Example 36 includes the computer-readable storage device of any of Examples 25 to 35, wherein the machine-learning model corresponds to a score-matching network.

The systems and methods illustrated herein may be described in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module or a decision model may take the form of a processing apparatus executing code, an internet based (e.g., cloud computing) embodiment, an entirely hardware embodiment, or an embodiment combining aspects of the internet, software, and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagram and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include one or more methods, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    determining, by one or more processors using a machine-learning model, multiple sets of image data, wherein each set of image data of the multiple sets of image data represents an estimated solution to an inverse problem associated with multiple waveform return measurements, and wherein determining the multiple sets of image data comprises:
        determining first image data of the multiple sets of image data based on a first set of waveform return measurements and using a first set of model parameters of the machine-learning model; and
        determining second image data of the multiple sets of image data based on a second set of waveform return measurements and using a second set of model parameters of the machine-learning model;
    determining, by the one or more processors based on the multiple sets of image data, a representative image; and
    generating, by the one or more processors, output data that identifies a first area of the representative image as less reliable than a second area of the representative image based on a statistical evaluation of two or more sets of image data of the multiple sets of image data.

2. The method of claim 1, wherein the multiple sets of image data include the first image data, the second image data, and one or more additional sets of image data.

3. The method of claim 1, wherein the representative image corresponds to an average image based on the multiple sets of image data.

4. The method of claim 1, wherein generating the output data comprises:
  determining statistics representing region-by-region variation across the multiple sets of image data; and
  identifying regions associated with higher variability as less reliable than regions associated with lower variability.

5. The method of claim 1, wherein generating the output data comprises:
  determining, based on the multiple sets of image data, pixel-by-pixel variability characteristics of the representative image; and
  assigning groups of pixels to the first area or the second area based on the pixel-by-pixel variability characteristics.

6. The method of claim 1, wherein the output data includes a graphical user interface depicting the representative image and visually distinguishing the first area from the second area.

7. The method of claim 1, wherein the first set of waveform return measurements is distinct from the second set of waveform return measurements.

8. The method of claim 1, wherein the first set of model parameters is distinct from the second set of model parameters.

9. The method of claim 1, wherein determining the first image data comprises performing multiple iterations of a gradient descent artifact reduction process, wherein a particular iteration of the gradient descent artifact reduction process includes:
  determining, using the machine-learning model, a gradient associated with a particular estimated solution to the inverse problem; and
  adjusting the particular estimated solution to the inverse problem based on the gradient to generate an updated estimated solution.

10. The method of claim 9, wherein the multiple iterations of the gradient descent artifact reduction process are initialized based on solution data determined via reverse time migration based on at least a subset of the multiple waveform return measurements.

11. The method of claim 1, wherein each image of the multiple sets of image data corresponds to a reflectivity image based on at least a subset of the waveform return measurements.

12. The method of claim 1, wherein the machine-learning model corresponds to a score-matching network.

13. A system comprising:
  one or more processors configured to:
    determine, using a machine-learning model, multiple sets of image data, wherein each set of image data of the multiple sets of image data represents an estimated solution to an inverse problem associated with multiple waveform return measurements, and wherein determination of the multiple sets of image data comprises:
      determination of first image data of the multiple sets of image data based on a first set of waveform return measurements and using a first set of model parameters of the machine-learning model; and
      determination of second image data of the multiple sets of image data based on a second set of waveform return measurements and using a second set of model parameters of the machine-learning model;
    determine, based on the multiple sets of image data, a representative image; and
    generate output data that identifies a first area of the representative image as less reliable than a second area of the representative image based on a statistical evaluation of two or more sets of image data of the multiple sets of image data.

14. The system of claim 13, wherein the multiple sets of image data include the first image data, the second image data, and one or more additional sets of image data.

15. The system of claim 13, wherein the representative image corresponds to an average image based on the multiple sets of image data.

16. The system of claim 13, wherein to generate the output data the one or more processors are configured to:
  determine statistics representing region-by-region variation across the multiple sets of image data; and
  identify regions associated with higher variability as less reliable than regions associated with lower variability.

17. The system of claim 13, wherein to generate the output data the one or more processors are configured to:
  determine, based on the multiple sets of image data, pixel-by-pixel variability characteristics of the representative image; and
  assign groups of pixels to the first area or the second area based on the pixel-by-pixel variability characteristics.

18. The system of claim 13, wherein the output data includes a graphical user interface depicting the representative image and visually distinguishing the first area from the second area.

19. The system of claim 13, wherein to determine the first image data the one or more processors are configured to perform multiple iterations of a gradient descent artifact reduction process, wherein a particular iteration of the gradient descent artifact reduction process includes:
  determining, using the machine-learning model, a gradient associated with a particular estimated solution to the inverse problem; and
  adjusting the particular estimated solution to the inverse problem based on the gradient to generate an updated estimated solution.

20. A computer-readable storage device storing instructions that, when executed by one or more processors, cause the one or more processors to:
  determine, using a machine-learning model, multiple sets of image data, wherein each set of image data of the multiple sets of image data represents an estimated solution to an inverse problem associated with multiple waveform return measurements, and wherein determining the multiple sets of image data comprises:
    determination of first image data of the multiple sets of image data based on a first set of waveform return measurements and using a first set of model parameters of the machine-learning model; and
    determination of second image data of the multiple sets of image data based on a second set of waveform return measurements and using a second set of model parameters of the machine-learning model;
  determine, based on the multiple sets of image data, a representative image; and
  generate output data that identifies a first area of the representative image as less reliable than a second area of the representative image based on a statistical evaluation of two or more sets of image data of the multiple sets of image data.

* * * * *